United States Patent
Kikuchi

(10) Patent No.: US 11,972,161 B2
(45) Date of Patent: Apr. 30, 2024

(54) APPLICATION, PRINTER DRIVER, AND INFORMATION PROCESSING APPARATUS INCLUDING A HASH ALGORITHM

(71) Applicant: CANON KABUSHIKI KAISHA, Tokyo (JP)

(72) Inventor: Hiroshi Kikuchi, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 64 days.

(21) Appl. No.: 17/565,626

(22) Filed: Dec. 30, 2021

(65) Prior Publication Data
US 2022/0214843 A1    Jul. 7, 2022

(30) Foreign Application Priority Data

Jan. 5, 2021 (JP) .................. 2021-000462

(51) Int. Cl.
*G06F 3/12* (2006.01)
*G06F 21/60* (2013.01)

(52) U.S. Cl.
CPC .......... *G06F 3/1238* (2013.01); *G06F 3/1204* (2013.01); *G06F 3/1222* (2013.01); *G06F 3/1292* (2013.01); *G06F 21/608* (2013.01)

(58) Field of Classification Search
None
See application file for complete search history.

(56) References Cited

U.S. PATENT DOCUMENTS

| 10,602,016 B2 | 3/2020 | Okazawa |
| 2013/0016388 A1 | 1/2013 | Amano |
| 2015/0169266 A1 | 6/2015 | Iwasaki et al. |
| 2015/0178026 A1* | 6/2015 | Sato ...................... G06F 3/1238 |
| | | 358/1.14 |
| 2019/0320083 A1* | 10/2019 | Okazawa ........... H04N 1/32272 |

FOREIGN PATENT DOCUMENTS

| EP | 2645226 A2 * | 10/2013 | ........... G06F 3/1204 |
| JP | 2019181865 A | 10/2019 | |

OTHER PUBLICATIONS

Extended European search report issued in European Appln. No. 21217175.5 dated Jun. 1, 2022.

* cited by examiner

*Primary Examiner* — Thomas D Lee
(74) *Attorney, Agent, or Firm* — ROSSI, KIMMS & McDOWELL LLP

(57) ABSTRACT

A print setting extension application is provided to a client terminal as an application used for extending a function of a printer driver that issues a print job used for performing printing at a printer registered in a cloud print server via the cloud print server that registers a printer in accordance with an instruction transmitted when a user performs an operation on the printer side. The print setting extension application issues, as a print job for a cloud print, a print job that requires entry of a password on the printer side when printing is performed.

11 Claims, 18 Drawing Sheets

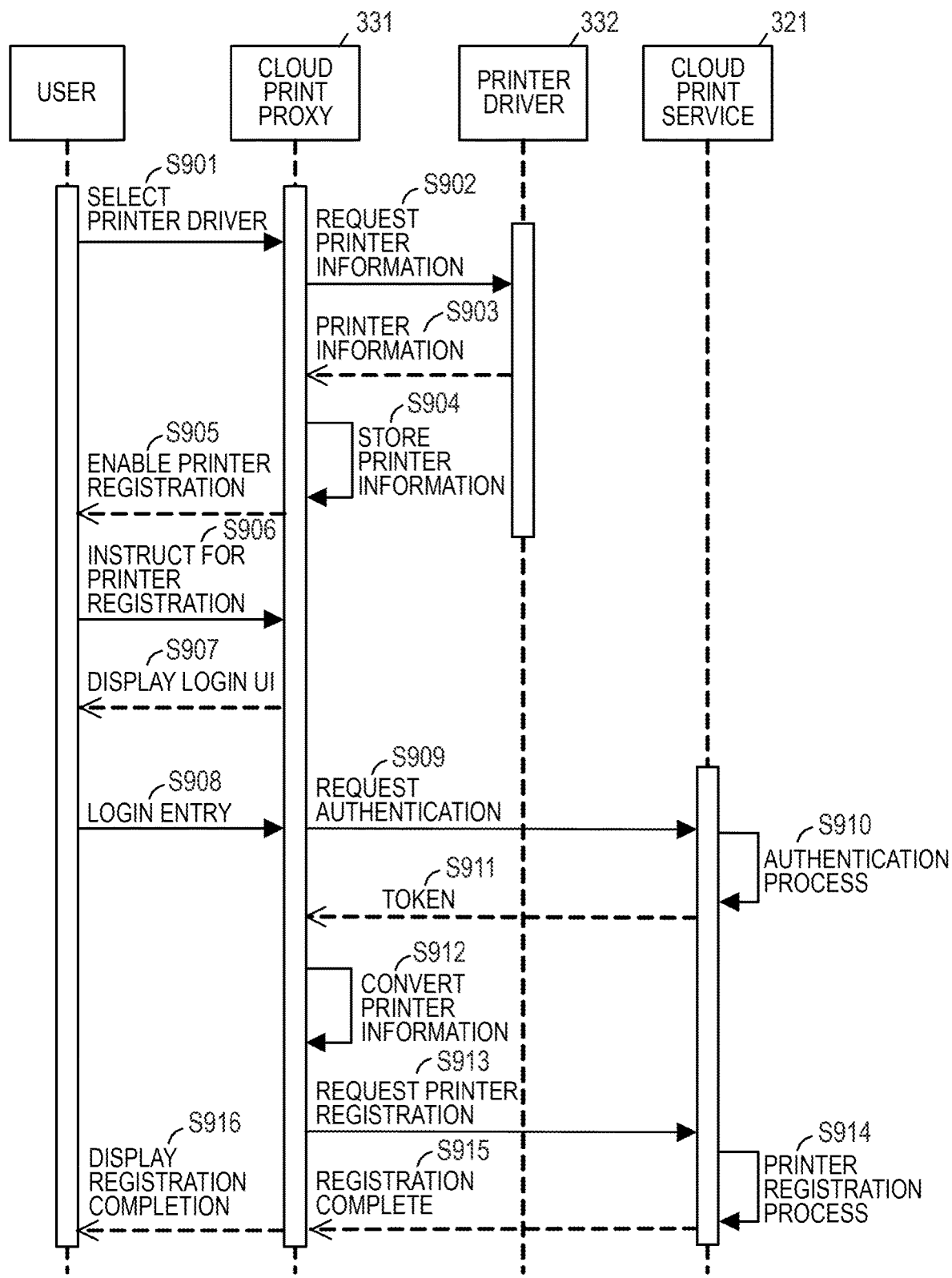

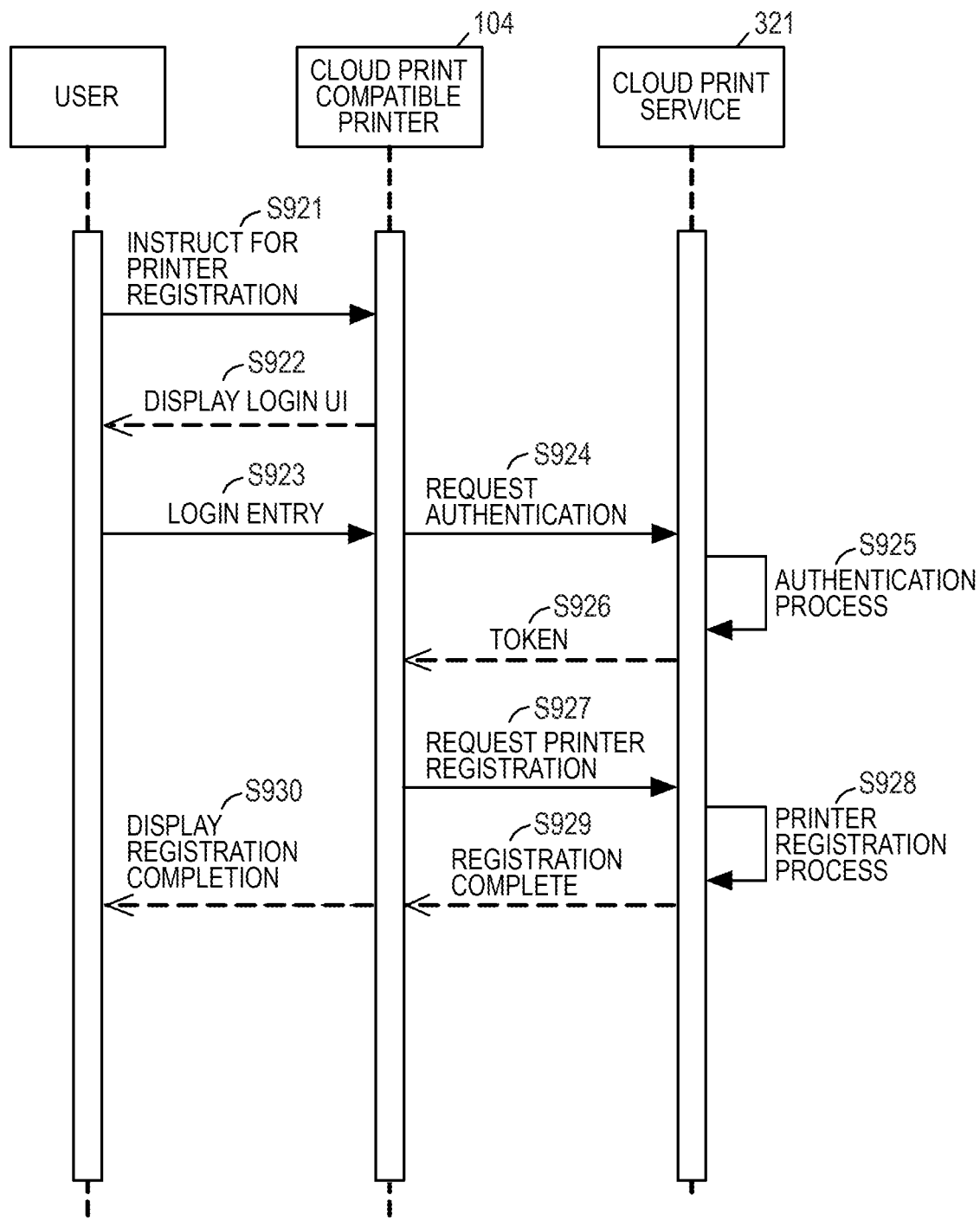

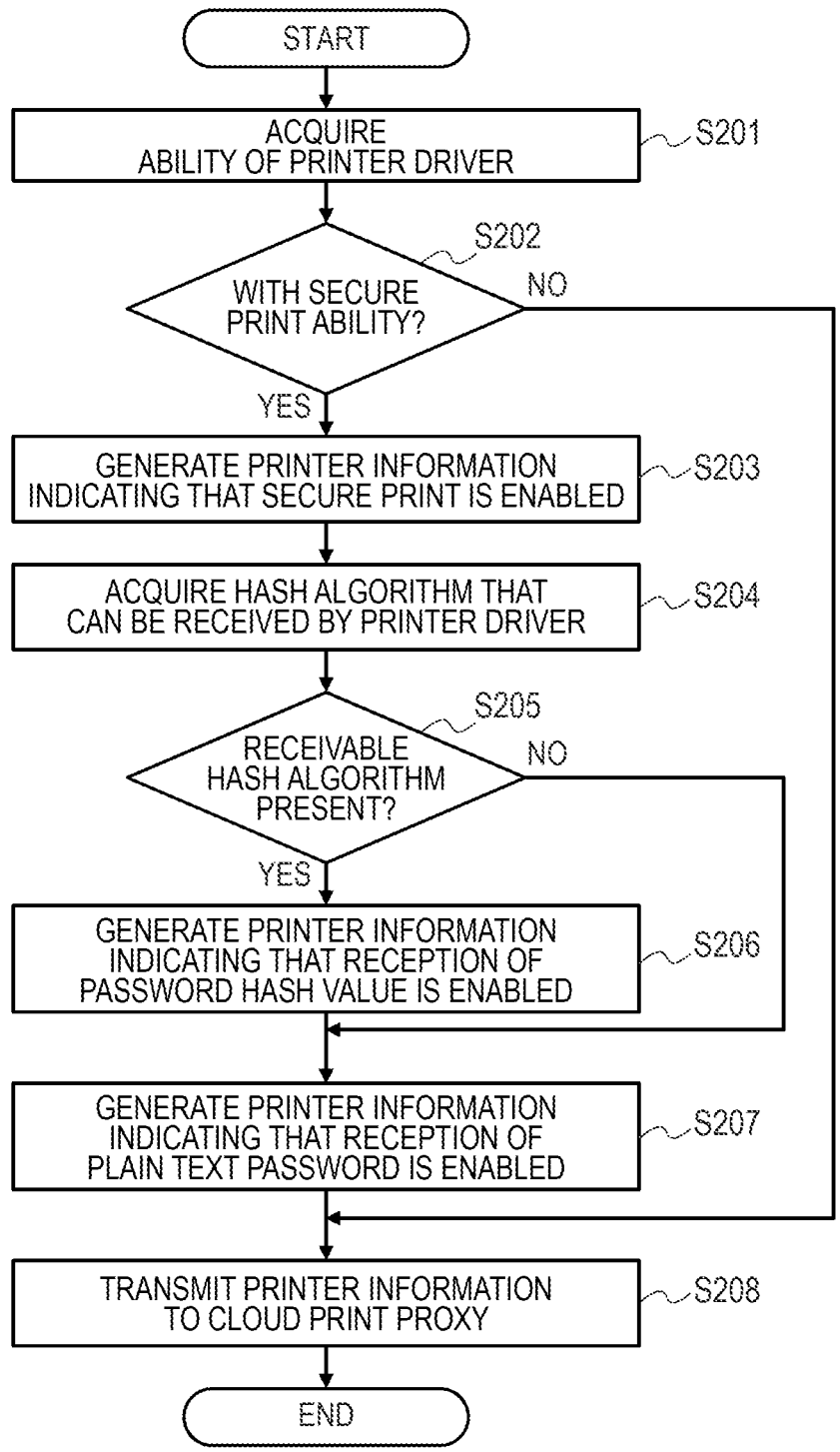

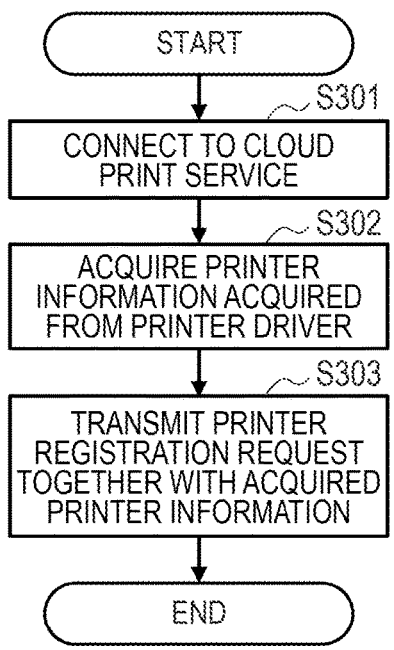
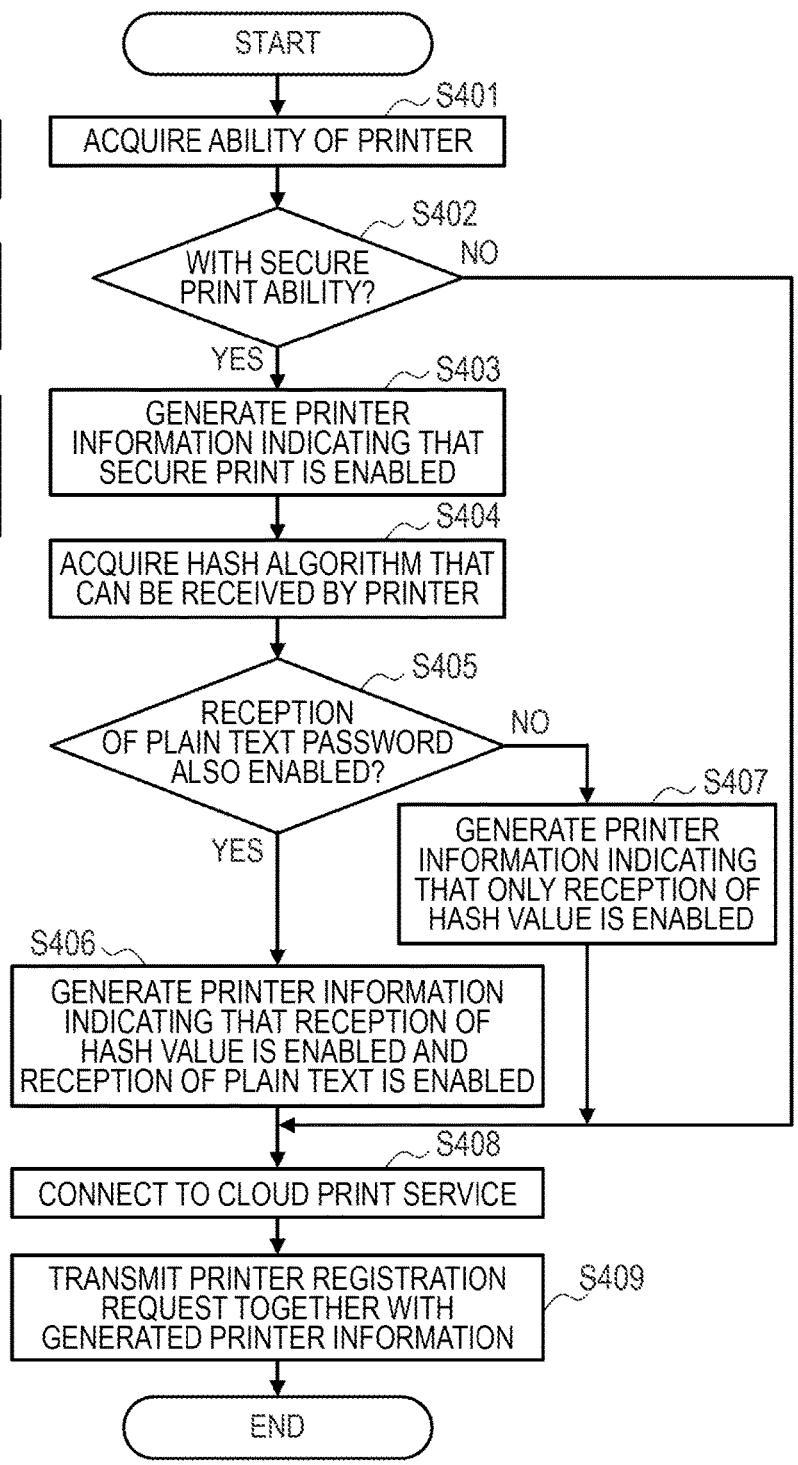

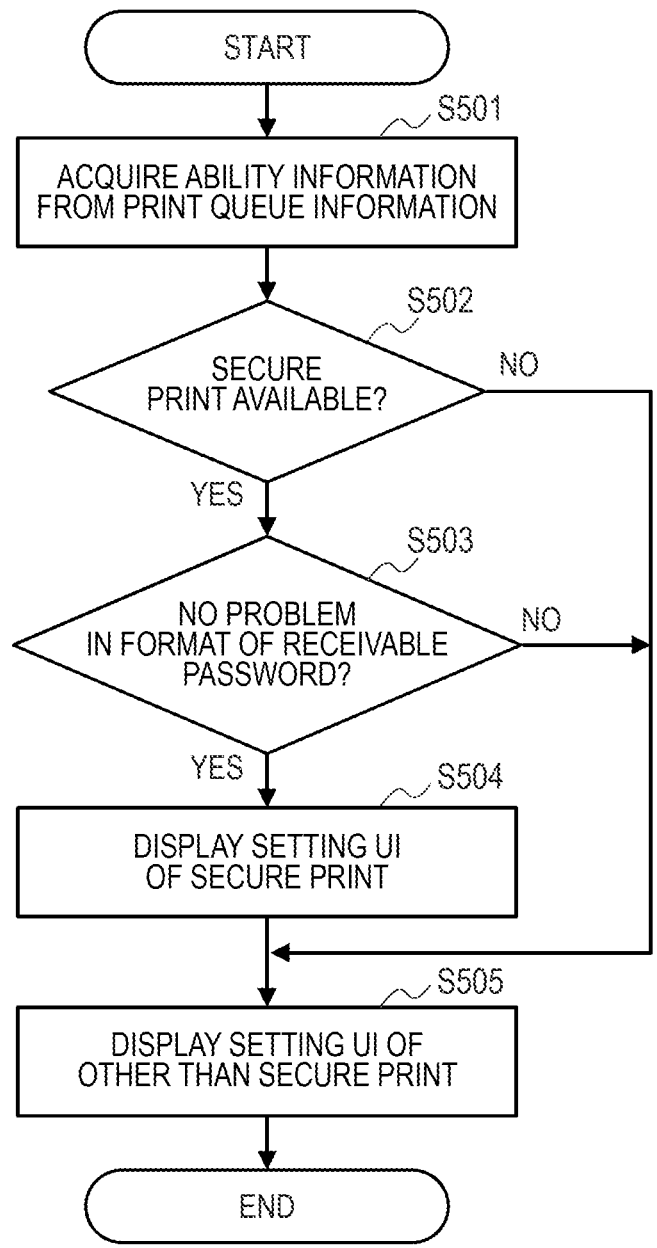

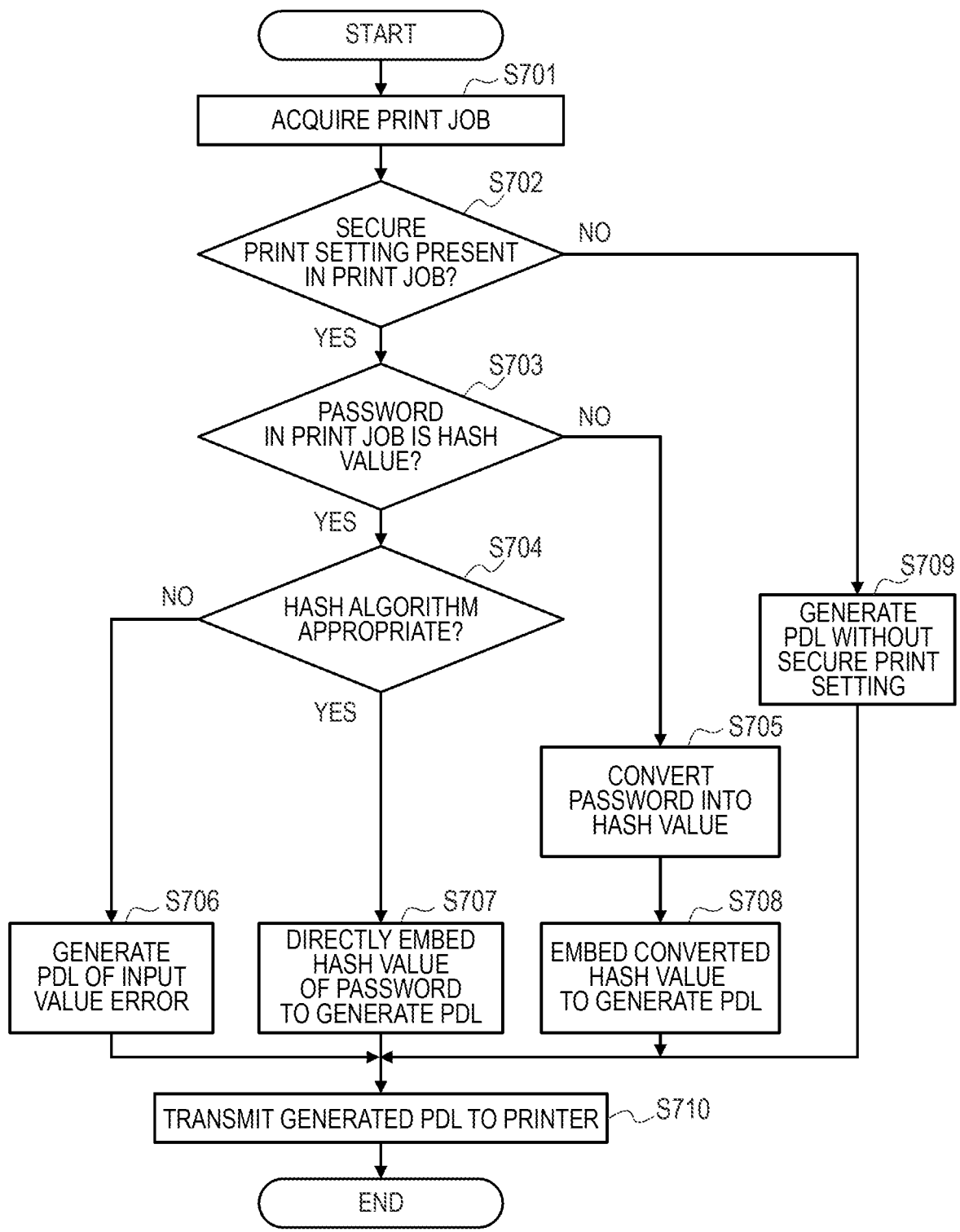

FIG. 13A

```
<Feature name="JobPasscode">
    <Property name="SelectionType">
        <Value>PickOne</Value>
    </Property>
    <Option name="On"/>
    <Option name="Off"/>
</Feature>
<ParameterDefname="JobPasscodeHashAlgorithm">
    <Property name="DataType ">
        <Value>string</Value>
    </Property>
    <Property name= " HashAlgorithm">
        <Value>sha2</Value>
    </Property>
</ParameterDef >
<ParameterDefname="JobPasscodeHashValue">
    <Property name=" DataType">
        <Value>string</Value>
    </Property>
</ParameterDef>
<ParameterDefname="JobPasscodeString">
    <Property name="DataType">
        <Value>string</Value>
    </Property>
    <Property name=" UnitType">
        <Value>numeric</Value>
    </Property>
</ParameterDef>
```

FIG. 13B

```
<Feature name="JobPasscode">
    <Option name ="On"/>
</Feature  >
<ParameterInitname=" JobPasscodeString">
    <Value>1234</Value  >
</ParameterInit>
```

FIG. 13C

```
<Feature name =" JobPasscode">
  <Option name="On"/>
</Feature >
<ParameterInitname="JobPasscodeHashAlgorithm">
    <Value>sha2</Value  >
</ParameterInit>
<ParameterInitname="JobPasscodeHashValue">
    <Value>03ac6742l6f3e15c761ee1a5e255f067953623c8b388b4459e13f978d7c846f4</Value>
</ParameterInit>
```

FIG. 14A

Query/response:IPP Response
Status- code:successful -ok
Printer- attribute - tag
-job- password- supported:TRUE
-job- password- encryption- supported:sha2

FIG. 14B

Printer- attribute- tag
-job- password:1234
-job- password- encryption:none

FIG. 14C

Printer- attribute- tag
-job- password:03ac6742f6f3e15c761ee1a5e255f067953623c8b388b4459 e13f978d7c846f4
-job- password- encryption:sha2

APPLICATION, PRINTER DRIVER, AND INFORMATION PROCESSING APPARATUS INCLUDING A HASH ALGORITHM

BACKGROUND OF THE INVENTION

Field of the Invention

The present invention relates to a technology of performing printing via a cloud print service.

Description of the Related Art

As software for controlling a printer, a type of software that uses a printer driver installed in a client terminal to perform printing at a printer connected to the client terminal is known. Operating system (hereafter, referred to as "OS"), which is basic software, is installed in a client terminal, and a printer driver is configured in accordance with a specification defined by the OS. A vendor that provides a printer provides a printer driver adapted to the OS specification and thereby can obtain a channel for providing a print instruction to the printer.

In recent years, however, generic printer drivers have been prepared on the OS side, and a channel to provide a print instruction using an industry-standard protocol such as Internet Printing Protocol (IPP) has been provided. Further, with the spread of cloud services, printing devices have network communication functions, and cloud print services that enable a user to provide print instruction from a terminal via the Internet is provided. When users log into a cloud print service on the Internet from various terminals, printers registered in the cloud print service will be ready to perform printing. In such a circumstance, a printer compatible with the cloud print service and a printer incompatible with the cloud print service are mixed. Thus, there is a method of using a proxy as a method for connecting a printer incompatible with a cloud print service to the cloud print service.

As another scheme, there is a printing form that is called secure print in which a user inputs a password during printing at a printer driver and printing is permitted only when the same password is then input on the printer side. This eliminates a concern about a printed material being taken away or glimpsed by others.

Japanese Patent Application Laid-Open No. 2019-181865 proposes a technology related to secure print using the IPP protocol.

However, the technology of Japanese Patent Application Laid-Open No. 2019-181865 relates to transfer between an IPP compatible printer and a client PC but does not realize secure print via a cloud print service. In conventional systems, it is not possible to perform secure print via a cloud print service.

The present invention has been made to solve the above problem. The present invention intends to provide a solution that enables secure print to be performed via a cloud print service.

SUMMARY OF THE INVENTION

One embodiment of the present invention is an application for extending a function of a printer driver that issues a print job used for performing printing at a printer registered in a cloud print server via the cloud print server that registers a printer in accordance with an instruction transmitted when a user performs an operation on the printer side, and a computer on which the printer driver operates is caused to function as an issuance unit that issues, as the print job, a print job that requires entry of a password on the printer side when printing is performed. According to a first aspect of the present invention an image forming apparatus is provided as set out in claim 1. According to a second aspect of the present invention a method is provided as set out in claim 5. According to a third aspect of the present invention a method is provided as set out in claim 9. According to a fourth and fifth aspect of the present invention a storage means is provided as set out in claim 14.

Further features of the present invention will become apparent from the following description of embodiments with reference to the attached drawings.

BRIEF DESCRIPTION OF THE DRAWINGS

FIG. 4A is a sequence diagram illustrating a process for registering printer information on a cloud print incompatible printer to the cloud print service.

FIG. 4B is a sequence diagram illustrating a process for registering printer information on a cloud print compatible printer to the cloud print service.

FIG. 9 illustrates a flowchart illustrating a process in which a printer driver transmits printer information.

FIG. 10A illustrates a flowchart illustrating a part of a process when the cloud print proxy performs a printer registration request on the cloud print service in the step S913 of FIG. 4A.

FIG. 10B illustrates a flowchart illustrating a part of a process when the cloud print compatible printer performs a printer registration request to the cloud print service in the step S927 of FIG. 4B.

FIG. 11A illustrates a flowchart illustrating a process in which the print setting extension application performs UI display.

FIG. 12 illustrates a flowchart illustrating a process in which the printer driver issues a print job.

FIG. 13A illustrates a diagram illustrating an example of the ability information in the printer information transmitted in the step S208 of FIG. 9.

FIG. 13B illustrates a diagram illustrating an example of the PrintTicket when a print job is issued with a plain text password.

FIG. 13C illustrates a diagram illustrating an example of the PrintTicket when a print job is issued with a password converted by a hash algorithm of SHA-2 instead of a plain text.

FIG. 14A illustrates a diagram illustrating an example of the ability information in the printer information to be transmitted.

FIG. 14B illustrates a diagram illustrating an example of the IPP attribute when a print job is issued with a plain text password.

FIG. 14C illustrates a diagram illustrating an example of the IPP attribute when a print job is issued with a password converted by a hash algorithm of SHA-2 instead of a plain text.

DESCRIPTION OF THE EMBODIMENTS

Embodiments of the present invention will be described below with reference to the drawings. Each of the embodiments of the present invention described below can be implemented solely or as a combination of a plurality of the embodiments or features thereof where necessary or where the combination of elements or features from individual embodiments in a single embodiment is beneficial.

Figure 1:
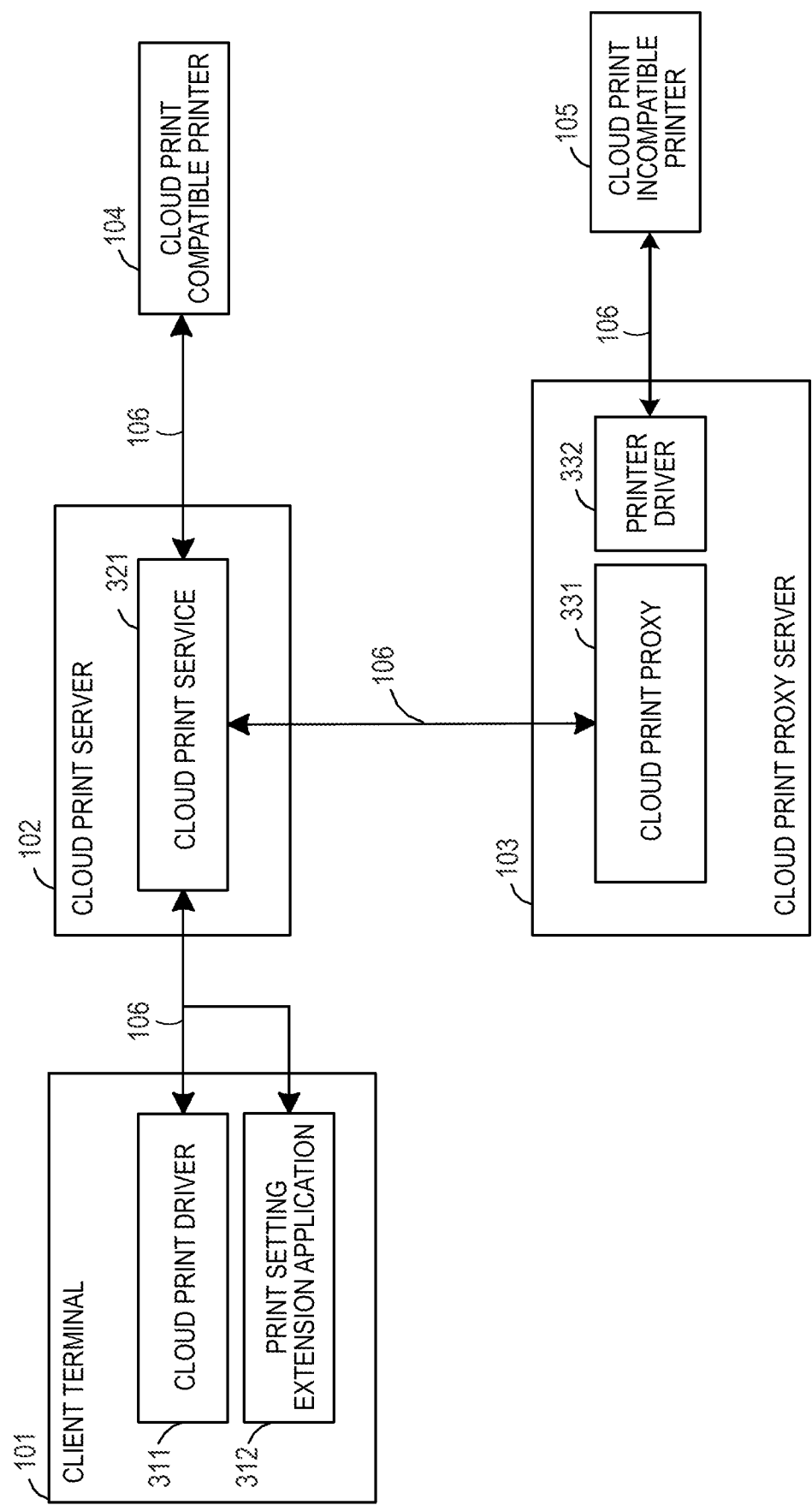
FIG. 1 is a configuration diagram of a cloud print system illustrating the present embodiment.

FIG. 1 is a diagram illustrating an example of the configuration of a cloud print system illustrating one embodiment of the present invention.

As illustrated in FIG. 1, a client terminal 101, a cloud print server 102, a cloud print proxy server 103, a cloud print compatible printer 104, and a cloud print incompatible printer 105 are connected to each other via a network 106. Note that, although FIG. 1 illustrates one client terminal 101, one cloud print compatible printer 104, and one cloud print incompatible printer 105, a plurality thereof may be provided, respectively.

The cloud print server 102 and the cloud print proxy server 103 may be a server system formed of a single information processing apparatus or may be a server system formed of a plurality of information processing apparatuses. When each server is formed of a plurality of information processing apparatuses, a processing load can be distributed. Further, a single server may be configured to internally, virtually serve as respective servers in a physical sense.

The network 106 is assumed to be WAN such as the Internet but may be a closed environment such as an intranet LAN.

An information processing apparatus operated by a user, such as a personal computer (PC), a tablet computer, a smartphone, or the like, operates as the client terminal 101. On the client terminal 101, any application software can be executed. A cloud print driver 311 and a print setting extension application 312 are installed in the client terminal 101.

The cloud print compatible printer 104 and the cloud print incompatible printer 105 are devices that actually perform printing on a physical sheet. The cloud print compatible printer 104 and the cloud print incompatible printer 105 receive print data transmitted from the cloud print server 102 via the network 106, converts the print data into image data, and prints the image data.

The cloud print compatible printer 104 is a printer that can communicate with the cloud print server 102 via a predetermined protocol. The predetermined protocol is, for example, the Internet Printing Protocol (IPP).

The cloud print incompatible printer 105 is a printer that is unable to perform communication via the above predetermined protocol. Accordingly, when printing via the cloud print server 102 is performed by using the cloud print incompatible printer 105, the cloud print incompatible printer 105 performs communication via the cloud print proxy server 103.

The cloud print server 102 is responsible for receiving print data formed of print settings and rendering data from the client terminal 101 and transmitting the received print data to the cloud print compatible printer 104 or the cloud print proxy server 103.

A cloud print service 321 operates on the cloud print server 102.

The cloud print proxy server 103 communicates with the cloud print server 102 on behalf of the cloud print incompatible printer 105 and transfers printer information or print data, such as transmits and receives the same. A cloud print proxy 331 and a printer driver 332 are installed in the cloud print proxy server 103.

Next, hardware components in the system of the present embodiment will be described with reference to FIG. 2A through FIG. 2E.

Figure 2A:
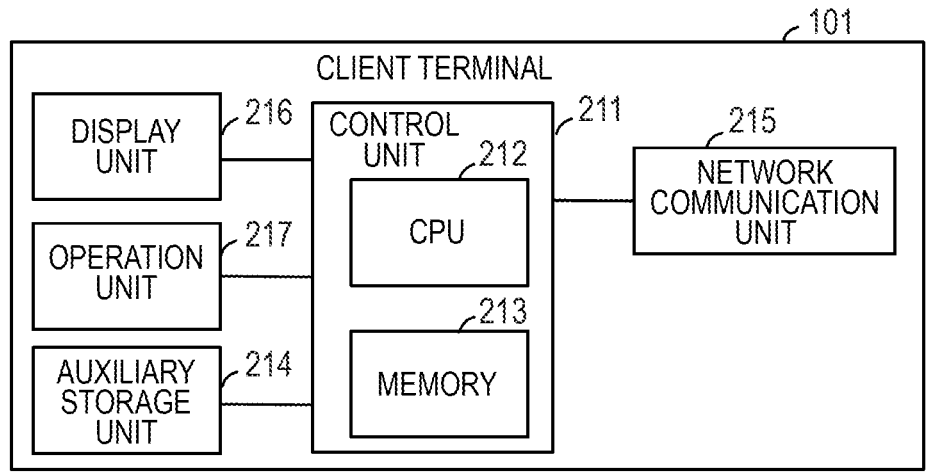
FIG. 2A illustrates a block diagram illustrating an example of the hardware components of the client terminal.

FIG. 2A is a block diagram illustrating an example of the hardware components of the client terminal 101.

The client terminal 101 includes a display unit 216, an operation unit 217, an auxiliary storage unit 214, a control unit 211, and a network communication unit 215.

The auxiliary storage unit 214 refers to a nonvolatile storage device such as a hard disk or a solid state drive (SSD) and is capable of storing and rewriting digital data.

The control unit 211 includes a CPU 212 and a memory 213 and controls the overall operation of the client terminal 101. The CPU 212 loads a program stored in the auxiliary storage unit 214 into the memory 213 and executes the program. The memory 213 is a main storage memory of the CPU 212 and is used as a work area or a temporary storage area into which various program is loaded.

The network communication unit 215 is a device that communicates with the external network 106 and inputs and outputs digital data to an external server, a client terminal, or the like via the network 106.

The display unit 216 is a device such as a liquid crystal display that displays visual information to the user.

The operation unit 217 is a device used for accepting input from the user through a keyboard, a pointing device (for example, a mouse), or the like. A device such as a touch panel having both the functions of the display unit 216 and the operation unit 217 may be used.

Figure 2B:
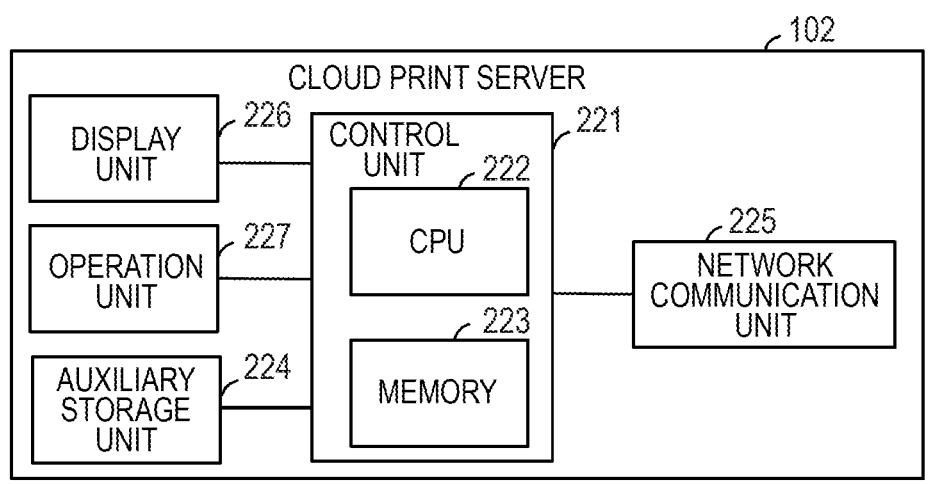
FIG. 2B illustrates a block diagram illustrating an example of the hardware components of the cloud print server.

FIG. 2B is a block diagram illustrating an example of the hardware components of the cloud print server 102.

The cloud print server 102 includes a display unit 226, an operation unit 227, an auxiliary storage unit 224, a control unit 221, and a network communication unit 225. The description of the display unit 226, the operation unit 227, the auxiliary storage unit 224, the control unit 221, and the network communication unit 225 is substantially the same as that for the client terminal 101 and thus will be omitted. Note that, although FIG. 2B illustrates one auxiliary storage unit 224, one control unit 221, and one network communication unit 225, one or a plurality thereof may be provided, respectively.

Figure 2C:
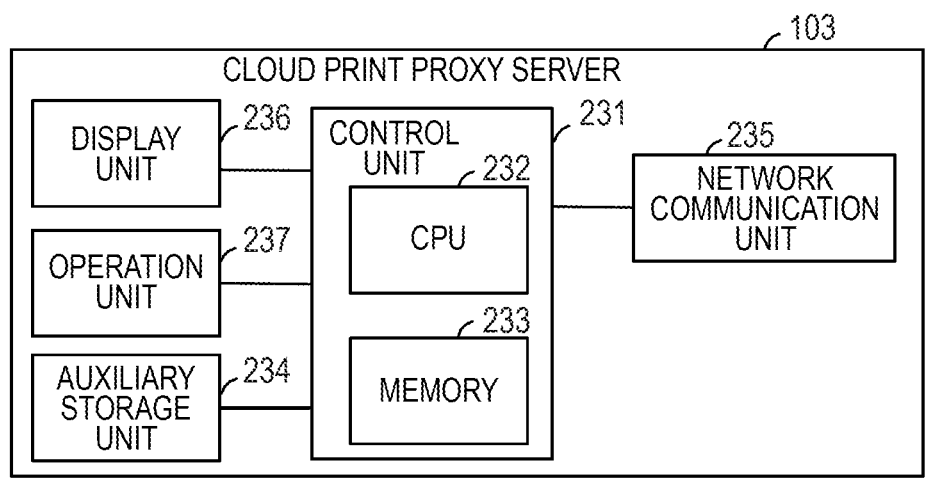
FIG. 2C illustrates a block diagram illustrating an example of the hardware components of the cloud print proxy server.

FIG. 2C is a block diagram illustrating an example of the hardware components of the cloud print proxy server 103.

The cloud print proxy server 103 includes a display unit 236, an operation unit 237, an auxiliary storage unit 234, a control unit 231, and a network communication unit 235. The description of the display unit 236, the operation unit 237, the auxiliary storage unit 234, the control unit 231, and the network communication unit 235 is substantially the same as that for the client terminal 101 and thus will be omitted. Although FIG. 2C illustrates one display unit 236, one operation unit 237, one auxiliary storage unit 234, one control unit 231, and one network communication unit 235, one or a plurality thereof may be provided, respectively.

Figure 2D:
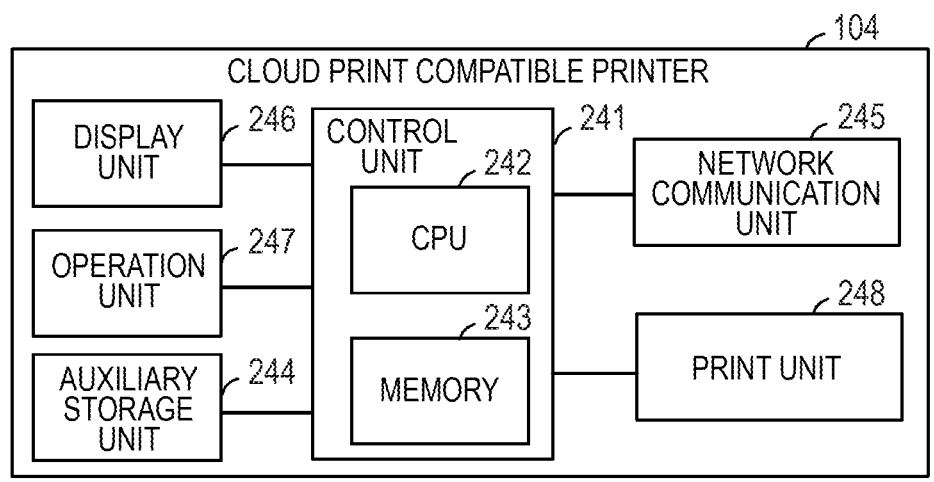
FIG. 2D illustrates a block diagram illustrating an example of the hardware components of the cloud print compatible printer.

FIG. 2D is a block diagram illustrating an example of the hardware components of the cloud print compatible printer 104.

The cloud print compatible printer 104 includes a display unit 246, an operation unit 247, an auxiliary storage unit 244, a control unit 241, a network communication unit 245, and a print unit 248.

The display unit 246 is a device that displays information to the user in real time, such as a touch panel or an LED mounted on the cloud print compatible printer 104.

The operation unit 247 is a device that accepts input from the user and may include hard keys such as number keys in addition to the touch panel.

Since the auxiliary storage unit 244 and the control unit 241 are substantially the same as those of the client terminal 101, the description thereof will be omitted. Note that one or a plurality of auxiliary storage units 244 and control units 241 may be provided, respectively.

The network communication unit 245 is a device that communicates with the external network 106 and is mainly responsible for receiving print data and transmitting the status of the cloud print compatible printer 104, such as an error, to the external server or the like.

The print unit 248 is a device that performs a print process on a sheet prepared in a cassette or a tray by performing a series of operations of paper feed, printing, and paper discharge. The scheme of printing may be an electrophotography scheme, an ink jet scheme, or the like and is not particularly limited. A double-sided unit or a finishing device for staple, punching, or the like used in paper discharge is also included in the print unit 248.

Note that, in the present embodiment, a single-function printer that performs only a print function is described as an example of the cloud print compatible printer 104. However, a multi-function printer (MFP) further having a scanner function or a FAX function may be used as the cloud print compatible printer 104.

Figure 2E:
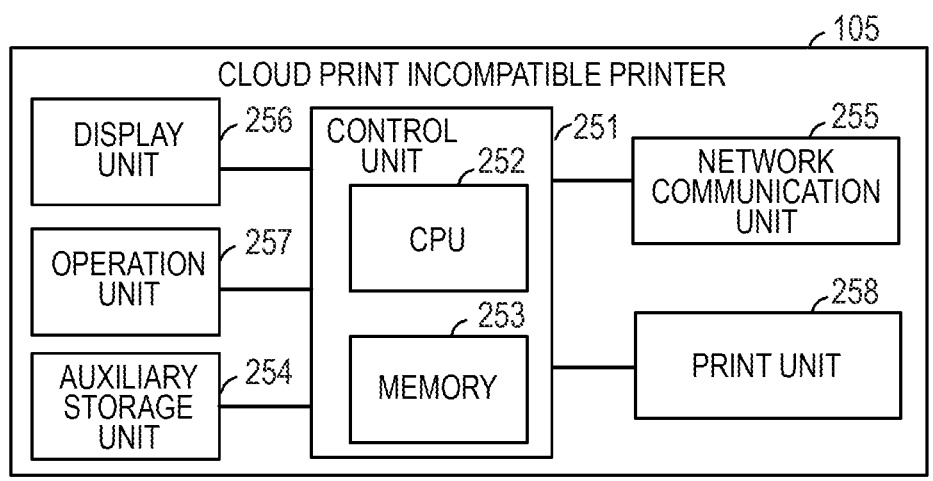
FIG. 2E illustrates a block diagram illustrating an example of the hardware components of the cloud print incompatible printer.

FIG. 2E is a block diagram illustrating an example of the hardware components of the cloud print incompatible printer 105.

The cloud print incompatible printer 105 includes a display unit 256, an operation unit 257, an auxiliary storage unit 254, a control unit 251, a network communication unit 255, and a print unit 258. The description of the display unit 256, the operation unit 257, the auxiliary storage unit 254, the control unit 251, the network communication unit 255, and the print unit 258 is substantially the same as that for the cloud print compatible printer 104 and thus will be omitted.

Next, software components in the system of the present embodiment will be described with reference to FIG. 3A through FIG. 3E.

Figure 3A:
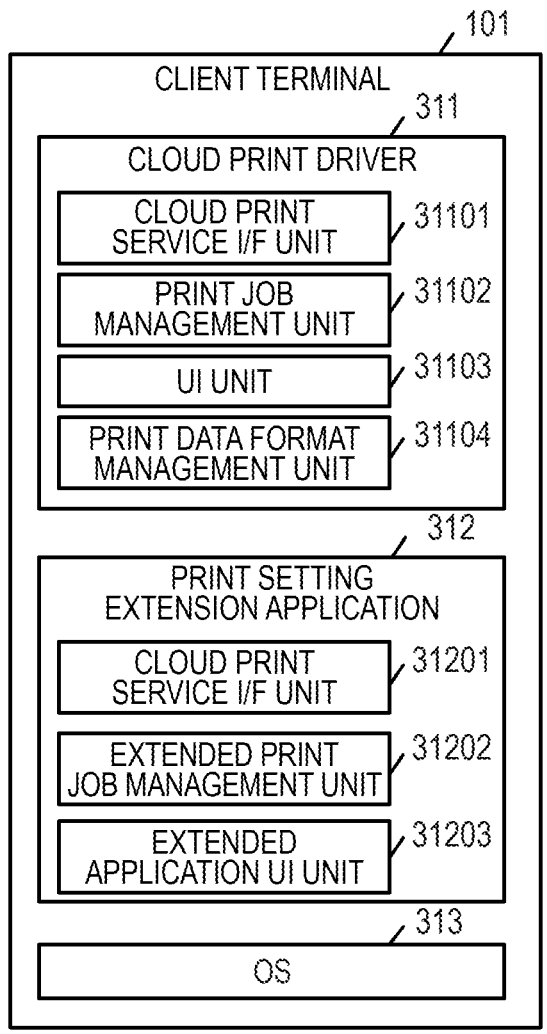
FIG. 3A illustrates a block diagram illustrating an example of the software components of the client terminal.

FIG. 3A is a block diagram illustrating an example of the software components of the client terminal 101.

The client terminal 101 has a cloud print driver 311, a print setting extension application 312, and operating system (OS) 313 as software components. When the CPU 212 of the client terminal 101 loads these software components into the memory 213 from the auxiliary storage unit 214 and executes the same, respective functions are implemented with the client terminal 101.

The cloud print driver 311 is software that generates print data to be transmitted to the cloud print server 102.

The print setting extension application 312 is an application program (hereafter, referred to as "application") for extending the function of the cloud print driver 311 and executes a process such as display control of a print setting window.

The OS 313 controls the overall software and hardware of the client terminal 101. The cloud print driver 311 and the print setting extension application 312 both are installed and managed in the OS 313.

The cloud print driver 311 further has the following software components. A cloud print service I/F unit 31101 processes transfer of data or commands with the cloud print service 321.

A print job management unit 31102 performs a process such as generation of a print job or transmission of a print job. A print job management unit 31102 generates print data in accordance with a protocol compatible with the cloud print service 321 and transmits the print data as a print job. For example, when print data is transmitted and received in accordance with the IPP, the print job management unit 31102 generates print data with the print setting being the IPP. Further, also for a file format of image data included in print data, the print job management unit 31102 generates print data in accordance with a file format (for example, PDF or PWG-Raster) supported by the cloud print service. Further, when print data is transmitted and received in accordance with XML Paper Specification (XPS), for example, the print job management unit 31102 generates print data by setting the print setting as the PrintTicket. In such a way, the print job management unit 31102 can issue a print job used for performing printing at a printer registered in the cloud print service 321 via the cloud print service 321.

A UI unit 31103 is responsible for displaying a user interface (UI) prepared by the cloud print driver 311, accepting a user operation from the client terminal 101, or the like.

The print data format management unit 31104 manages the format of print data output by the cloud print driver 311. Specifically, the print data format management unit 31104 manages whether to output print data in the IPP format or output print data in the XPS format.

The print setting extension application 312 further has the following software components.

A cloud print service I/F unit 31201 processes transfer of data or commands with the cloud print service 321. The cloud print service I/F unit 31201 acquires information on a printer or a print setting set in the print setting UI from the cloud print driver 311. Further, the cloud print service I/F unit 31201 is responsible for delivering a print setting set in the print setting extension application 312 to the cloud print driver 311.

An extended print job management unit 31202 performs a process such as generation of a print job, editing of a print job generated by the print job management unit 31102 of the cloud print driver 311, transmission of a print job, or the like.

An extended application UI unit 31203 is responsible for displaying a UI prepared by the print setting extension application 312, accepting a user operation from the client terminal 101, or the like. The print setting displayed by the extended application UI unit 31203 indicates an additional print setting in accordance with a printer that performs printing via the cloud print server 102, such as a print setting unique to a printer vendor, in comparison to a print setting displayed by the UI unit 31103. An example of the print setting extension UI displayed by the print setting extension application 312 will be described later with reference to FIG. 7.

Figure 3B:
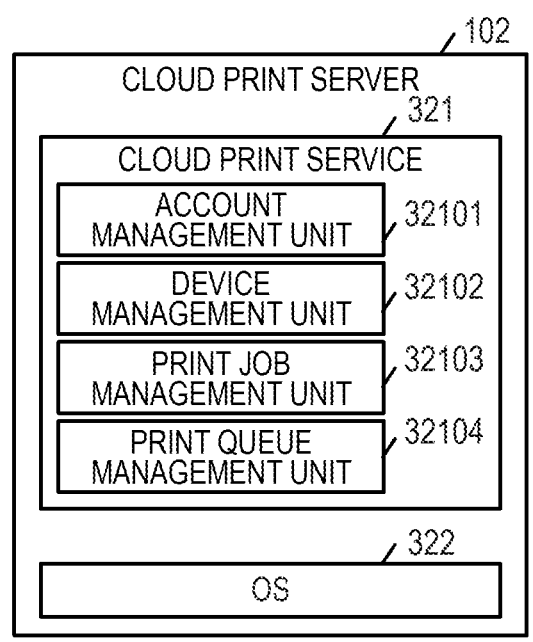
FIG. 3B illustrates a block diagram illustrating an example of the software components of the cloud print server.

FIG. 3B is a block diagram illustrating an example of the software components of the cloud print server 102.

The cloud print server 102 has a cloud print service 321 and OS 322 as the software components. When a CPU 222 of the cloud print server 102 loads these software components into a memory 223 from the auxiliary storage unit 224 and executes the same, respective functions are implemented with the cloud print server 102.

The cloud print service 321 further has the following software components.

An account management unit 32101 manages a tenant that has been registered in the cloud print service 321 and user authentication. The tenant is a group to which one or a plurality of users belong. The account management unit 32101 manages a user ID of each user and information on a password or the like required for authentication in association with each other. Furthermore, the account management unit 32101 manages a user ID and a tenant ID, which the user belongs to, in association with each other.

A device management unit 32102 manages information (device information) related to a printer that has been registered in the cloud print service 321. The device information is registered to the device management unit 32102 in response to a registration request from a printer. The device information will now be described with reference to FIG. 15A.

Figure 15A:
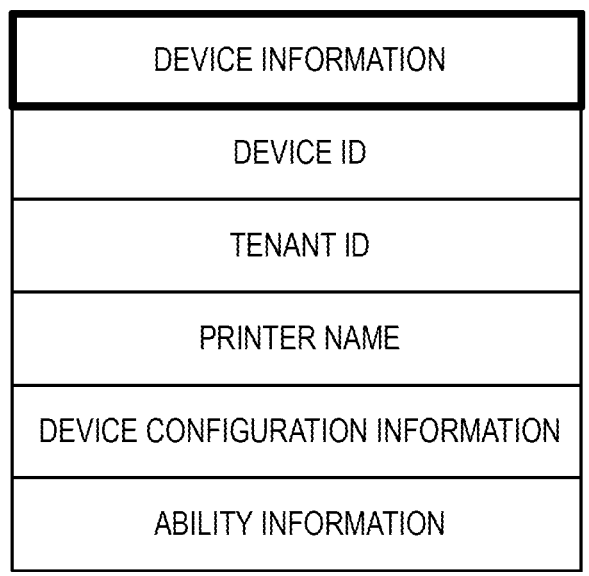
FIG. 15A illustrates a diagram illustrating an example of the device information registered in the device management unit.

FIG. 15A is a diagram illustrating an example of the device information registered in the device management unit 32102.

A device ID is identification information unique to a printer. A tenant ID is identification information on a tenant that can use a device of interest. A print name is the name of a device of interest notified from a printer. Device configuration information is configuration information on a printer, which is information as to whether or not a finisher that performs a post-process such as staple or punching is connected to a printer, whether or not a unit that performs double-sided printing is connected, or the like. Ability information is information indicating a function that can be performed by a printer. The ability information includes information as to whether or not color printing is available, information as to whether or not double-sided printing is available, information on a position at which a staple is available, information on an available punch hole, information as to whether or not a secure print function is available, or the like.

The description goes back to FIG. 3B below.

A print job management unit 32103 performs determination as to whether or not to permit a print job delivery request from the cloud print compatible printer 104 or the cloud print proxy server 103, management of delivery of a print job, or the like.

A print queue management unit 32104 externally receives a print job and holds the print job received in an area prepared within the auxiliary storage unit 224 of the cloud print server 102. The print queue management unit 32104 manages print queue information illustrated in FIG. 15B. The print queue information will be described here with reference to FIG. 15B.

Figure 15B:
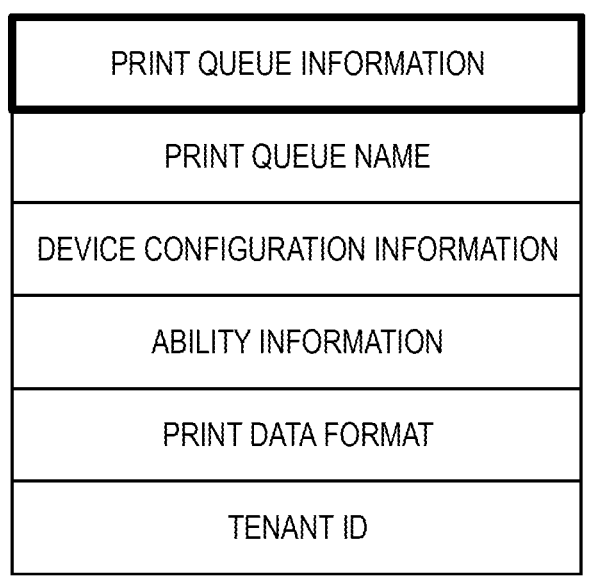
FIG. 15B illustrates a diagram illustrating an example of device information registered in the device management unit.

FIG. 15B is a diagram illustrating an example of device information registered in the device management unit 32102.

The print queue information includes a print queue name, device configuration information, ability information, a print data format, and a tenant ID. The print queue name is a name that can identify a print queue of interest. The device configuration information and the ability information are the same information as the device information of FIG. 15A. The print data format refers to a print data format that is optimal for a print job handled by a print queue of interest. The type of print data format in the present embodiment may be the IPP or the XPS but not limited thereto. The tenant ID is identification information on a tenant that can use a print queue of interest. The device information illustrated in FIG. 15A and the print queue information illustrated in FIG. 15B are associated with each other by using a tenant ID as a key.

The description goes back to FIG. 3B below.

The OS 322 controls the overall software and hardware of the cloud print server 102.

Figure 3C:
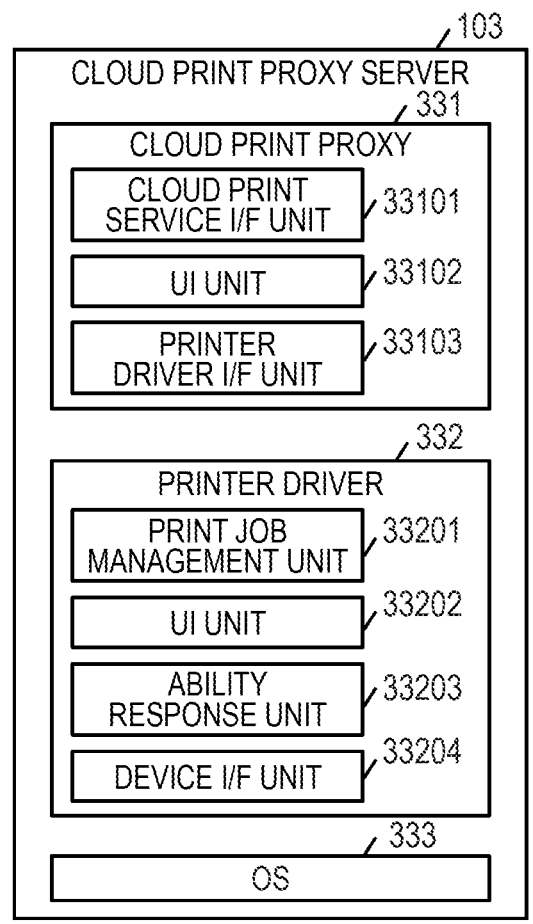
FIG. 3C illustrates a block diagram illustrating an example of the software components of the cloud print proxy server.

FIG. 3C is a block diagram illustrating an example of the software components of the cloud print proxy server 103.

The cloud print proxy server 103 has the cloud print proxy 331, the printer driver 332, and OS 333 as software components. When a CPU 232 of the cloud print proxy server 103 loads these software components into a memory 233 from the auxiliary storage unit 234 and executes the same, respective functions are implemented with the cloud print proxy server 103.

The cloud print proxy 331 further has the following software components.

A cloud print service I/F unit 33101 processes transfer of data or commands with the cloud print service 321.

A UI unit 33102 controls the UI of the cloud print proxy 331. Specifically, the UI unit 33102 controls the UI used for displaying a list of the printer drivers 332 installed in the cloud print proxy server 103 or registering the printer driver 332 selected from the list to the cloud print service 321. The registration of the printer driver 332 will be described later with reference to FIG. 4A and FIG. 4B. A printer driver I/F unit 33103 processes transfer of data or commands with the printer driver 332.

Further, the printer driver 332 has the following software components.

A print job management unit 33201 converts print data including a print setting and rendering data transmitted from the cloud print proxy 331 into print data described in PDL that can be processed by a printer and transmits the converted print data to the printer. Note that PDL stands for Page Description Language.

A UI unit 33202 controls the UI of the printer driver 332. This UI enables edition of a print setting.

An ability response unit 33203 provides the ability of the printer driver 332 or the cloud print incompatible printer 105 to the cloud print proxy 331.

A device I/F unit 33204 processes transfer of data or commands with the printer driver 332 and the cloud print incompatible printer 105.

The OS 333 controls the overall software and hardware of the cloud print proxy server 103.

Figure 3D:
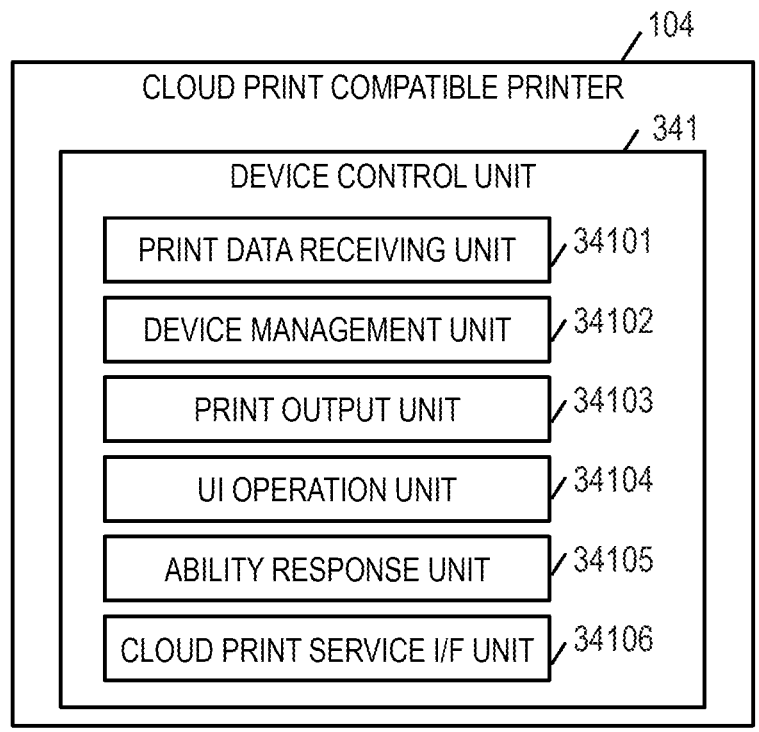
FIG. 3D illustrates a block diagram illustrating an example of the software components of the device control unit of the cloud print compatible printer.

FIG. 3D is a block diagram illustrating an example of the software components of the device control unit 341 of the cloud print compatible printer 104. When a CPU 242 of the cloud print compatible printer 104 loads the device control unit 341 as software into a memory 243 from the auxiliary storage unit 244 and executes the software, the function thereof is implemented with the cloud print compatible printer 104.

A print data receiving unit 34101 externally accepts print data transmitted via the network 106 and saves the print data in the auxiliary storage unit 244 of the cloud print compatible printer 104. The print data receiving unit 34101 can process print data of a predetermined protocol that can be generated by the cloud print server 102.

A device management unit 34102 manages options connected to the cloud print compatible printer 104, ability information, a sheet remaining amount, an ink/toner remaining amount, or the like.

A print output unit 34103 performs printing on a sheet.

A UI operation unit 34104 acquires UI display to the operation unit 247 of the cloud print compatible printer 104 or an instruction or information input via the UI.

An ability response unit 34105 transmits an ability of a print setting that can be designated at the time of printing by the cloud print compatible printer 104 to the cloud print service 321 via the cloud print service I/F unit 34106.

A cloud print service I/F unit 34106 processes transfer of data or commands with the cloud print service 321.

Figure 3E:
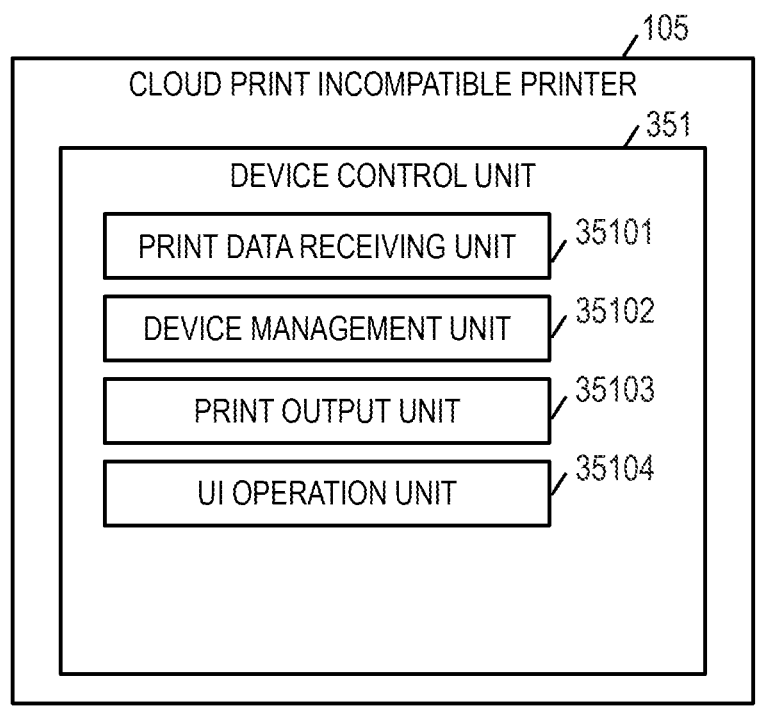
FIG. 3E illustrates a block diagram illustrating an example of the software components of the device control unit of the cloud print incompatible printer.

FIG. 3E is a block diagram illustrating an example of the software components of the device control unit 351 of the cloud print incompatible printer 105. When a CPU 252 of the cloud print incompatible printer 105 loads the device control unit 351 as software into a memory 253 from the auxiliary storage unit 254 and executes the same, the function thereof is implemented with the cloud print incompatible printer 105.

A print data receiving unit 35101 receives print data from the device I/F unit 33204 of the printer driver 332. The print data receiving unit 35101 does not support the format of print data transmitted by the cloud print server 102 and is thus unable to interpret such print data. In the present embodiment, print data transmitted by the cloud print server 102 is converted by the printer driver 332 of the cloud print proxy server 103 into a format that can be processed by the print data receiving unit 35101. This realizes printing via the cloud print server 102 by using the cloud print incompatible printer 105.

The description of a device management unit 35102, a print output unit 35103, and a UI operation unit 34104 is substantially the same as that for the cloud print compatible printer 104 and thus will be omitted.

Next, a sequence in registration of the cloud print incompatible printer 105 to the cloud print service 321 will be described with reference to FIG. 4A.

FIG. 4A is a diagram illustrating an example of user procedures and a sequence between each software and a service related to registration of the cloud print incompatible printer 105 to the cloud print service 321. Note that it is assumed that the printer driver 332 has been installed in the cloud print proxy server 103, and a print queue corresponding to the cloud print incompatible printer 105 has been generated.

First, the user operates the cloud print proxy 331 to select the printer driver 332 used for cloud print incompatible printer 105 to be connected, and the cloud print proxy 331 accepts the selection operation (S901).

Next, the cloud print proxy 331 requests printer information from the printer driver 332 selected in S901 described above (S902). The printer information is a printer hardware ID, a model name, device configuration information, ability information that can be set, or the like.

Next, the printer driver 332 transmits printer information back to the cloud print proxy 331 (S903).

Next, the cloud print proxy 331 stores the received printer information in association with the printer driver 332 (S904).

Next, the cloud print proxy 331 enables a printer registration button on the UI and indicates to the user that printer registration is enabled (S905).

Next, the user presses the printer registration button enabled in S905 described above to provide an instruction for printer registration, and the cloud print proxy 331 accepts the registration instruction (S906).

Next, the cloud print proxy 331 displays a login UI used for login to the cloud print service 321 on the UI (S907).

Next, the user inputs login information to the login UI, and the cloud print proxy 331 accepts the input (step S908).

Next, the cloud print proxy 331 transmits an authentication request to the cloud print service 321 together with login information input in S908 described above (S909).

Next, the cloud print service 321 performs an authentication process based on the authentication request of S909 described above (S910).

If the authentication of S910 described above is successful, the cloud print service 321 issues a token for access and transmits the token back to the cloud print proxy 331 (S911). This token is a token used when the cloud print proxy 331 accesses the cloud print service 321 from the next time. Note that, if the authentication fails in S910, the process illustrated in FIG. 4A ends.

Next, the cloud print proxy 331 converts a data format of printer information stored in S904 described above into a format that can be handled by the cloud print service 321 (S912). The format that can be handled by the cloud print service 321 is a format in accordance with the IPP, for example.

The cloud print proxy 331 then transmits a printer registration request to the cloud print service 321 together with the token received in S911 described above and the converted printer information (S913).

Next, the cloud print service 321 performs a printer registration process based on the printer registration request of S913 described above (S914). Note that details of the printer registration process performed in S914 will be described later.

Next, the cloud print service 321 transmits the registration completion status back to the cloud print proxy 331 (S915) after the printer registration process of S914 described above. The cloud print proxy 331 then displays the registration completion status on the UI (S916).

Next, a sequence in registration of the cloud print compatible printer 104 to the cloud print service 321 will be described with reference to FIG. 4B.

FIG. 4B is a diagram illustrating an example of user procedures and a sequence between each software and a service related to registration of the cloud print compatible printer 104 to the cloud print service 321 in the present embodiment.

First, the user provides an instruction for printer registration from the operation unit 247 at the cloud print compatible printer 104, and the cloud print compatible printer 104 accepts the instruction (S921).

Next, the cloud print compatible printer 104 displays a login UI used for login to the cloud print service 321 on the operation unit 247 on which the printer registration has been instructed in S921 described above (S922).

Next, the user inputs login information to the login UI displayed in S922 described above, and the cloud print compatible printer 104 accepts the login information (S923). The login information is a user ID or a password.

Next, the cloud print compatible printer 104 transmits the login information input in S923 described above and an authentication request to the cloud print service 321 (S924).

Next, the cloud print service 321 performs an authentication process based on the login information received together with the authentication request in S924 described above (S925). If the authentication is successful, the cloud print service 321 issues a token for access and transmits the token to the cloud print compatible printer 104 (S926). This token is a token used when the cloud print compatible printer 104 accesses the cloud print service 321 from the next time. Note that, if the authentication fails in S925, the process illustrated in FIG. 4B ends.

Next, the cloud print compatible printer 104 transmits the printer registration request to the cloud print service 321 together with the token received in S926 described above and printer information on its own (S927).

The cloud print service 321 performs a printer registration process based on a printer registration request received at S927 described above (S928). Details of the printer registration process performed in S928 will be described later.

Next, after completion of the printer registration process, the cloud print service 321 transmits the registration completion status back to the cloud print compatible printer 104 (S929).

The cloud print compatible printer 104 then displays the registration completion status on the operation unit 247 (S930).

As described above, the cloud print server 102 (cloud print service 321) is to perform registration of the printer based on an instruction (request) transmitted by the user performing an operation on the printer side.

Next, the printer registration process (S914, S928) performed by the cloud print service 321 will be described. This printer registration process corresponds to a process in which the cloud print service 321 registers a printer in response to a printer registration request.

Figure 5:
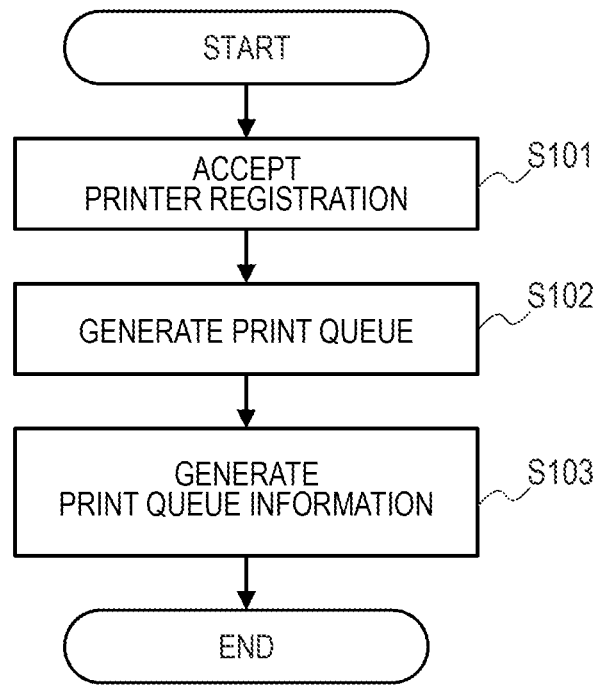
FIG. 5 illustrates a flowchart of a printer registration process performed by the cloud print service.

FIG. 5 is a flowchart illustrating an example of a printer registration process performed by the cloud print service 321. All the process illustrated in FIG. 5 is implemented when the program of the cloud print service 321 stored in the auxiliary storage unit 224 of the cloud print server 102 is loaded into the memory 223 and executed by the CPU 222. Note that this process is started as a result that the cloud print service 321 has externally received a printer registration request via the network 106.

First, the cloud print service 321 accepts a printer registration request (S101) and proceeds with the process to S102.

In S102, the cloud print service 321 generates a print queue from the printer information received together with a printer registration request that has been accepted in S101 described above.

Next, the cloud print service 321 generates print queue information (S103). Note that FIG. 15B illustrates an example of the print queue information. An optimal print data format in the print queue information is determined from ability information included in the printer registration request.

Next, a sequence from startup of the print setting extension application 312 to display of the print setting extension UI will be described with reference to FIG. 6.

Figure 6:
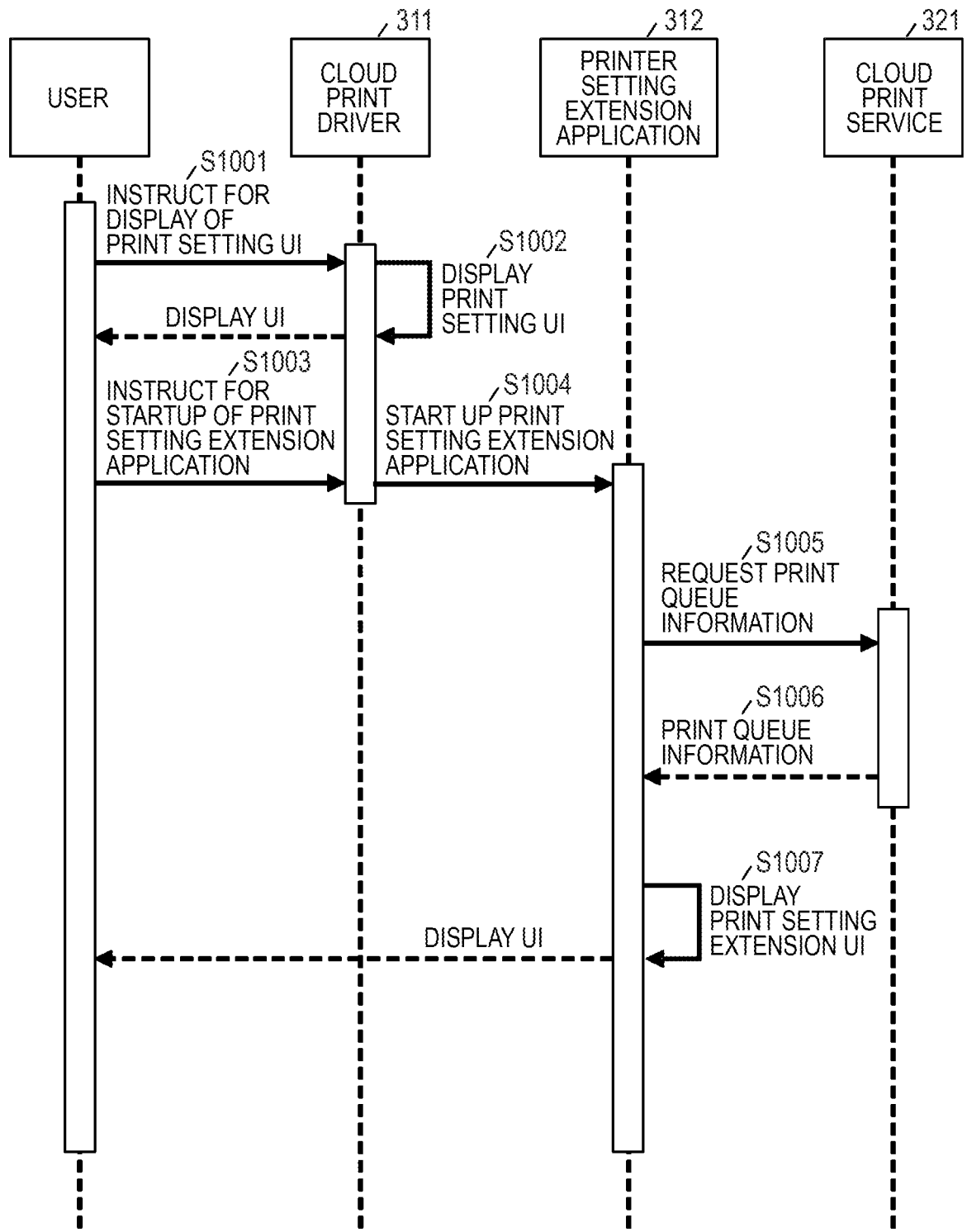
FIG. 6 is a sequence diagram from startup of a print setting extension application to display of a print setting extension UI.

FIG. 6 is a diagram illustrating an example of user procedures and a sequence between each software and a service from startup of the print setting extension application 312 to display of the print setting extension UI in the present embodiment.

First, the user provides a display instruction of the print setting UI in an application, and the cloud print driver 311 accepts the display instruction of the print setting UI via the application (S1001).

The cloud print driver 311 displays a print setting UI in response to the display instruction of the print setting UI accepted in S1001 described above (S1002).

The user operates the print setting UI displayed in S1002 described above to provide an instruction for startup of the print setting extension application 312 (S1003). The user selects a detailed setting button (not illustrated) of the print setting UI, and thereby the cloud print driver 311 accepts a startup instruction of the print setting extension application 312.

In response to the startup instruction of the print setting extension application 312 accepted in S1003 described above, the cloud print driver 311 instructs the print setting extension application 312 to start up (S1004). In response, the print setting extension application 312 starts up.

The print setting extension application 312 that has started up transmits an acquisition request of print queue information to the cloud print service 321 (S1005).

The cloud print service 321 transmits, to the print setting extension application 312, print queue information (FIG. 15B) corresponding to the acquisition request received from the print setting extension application 312 in S1005 described above (S1006).

Figure 7:
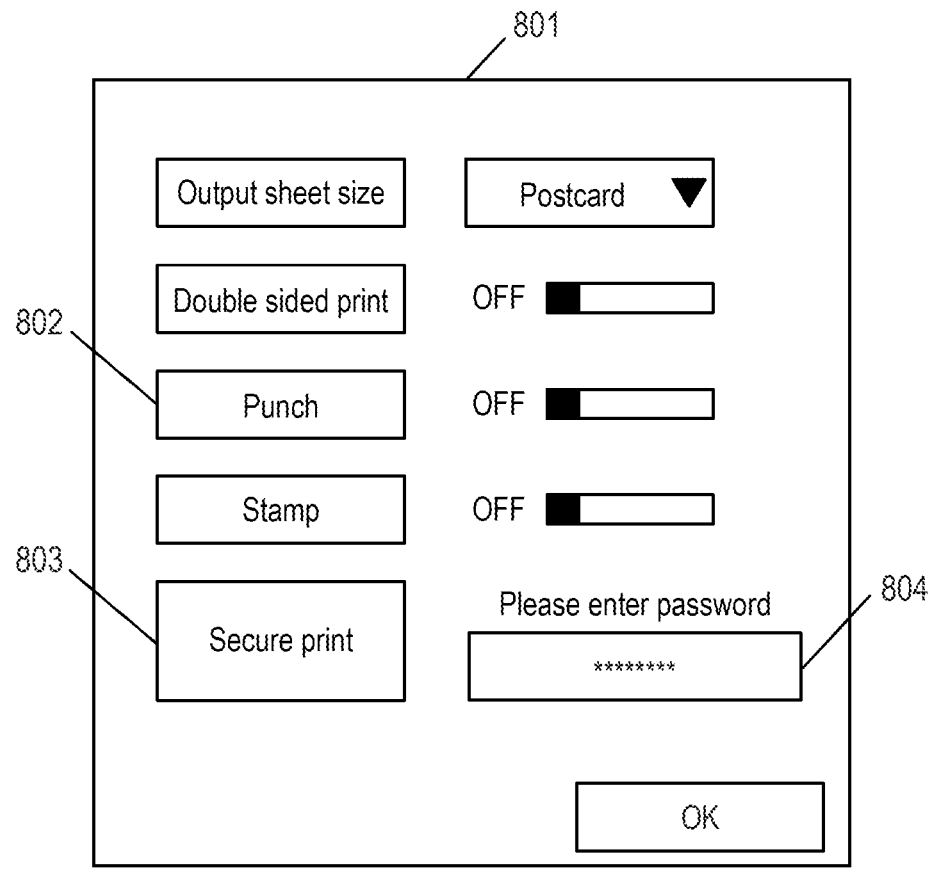
FIG. 7 is a diagram illustrating the print setting extension UI.

The print setting extension application 312 displays the print setting extension UI as illustrated in FIG. 7 based on the print queue information (FIG. 15B) acquired in S1006 described above (S1007).

FIG. 7 is a diagram illustrating an example of the print setting extension UI displayed by the print setting extension application 312 in S1007 of FIG. 6.

A print setting extension UI 801 is an example of the print setting extension UI of the print setting extension application 312 that displays a secure print function and a punching function of an attachable finisher.

Reference 802 denotes a UI related to setting of a punching function that is one of the print settings of the attachable finisher. The print setting extension application 312 displays the UI 802 of the punching function only when the punching function is included in ability information acquired from the cloud print service 321.

Reference 803 denotes a UI related to setting of a secure print function that is one of the print settings. Further, reference 804 denotes a region used for password entry required for a secure print function. The print setting extension application 312 displays the secure print function UI 803 and the password entry region 804 only when the secure print function is included in ability information of print queue information (FIG. 15B) acquired from the cloud print service 321.

When the user inputs a password to the password entry region 804 to provide a print instruction at the time of printing, the user is able to have a printed material output by inputting the same password at the operation unit 247 of the cloud print compatible printer 104. Similarly, when the cloud print incompatible printer 105 is used for printing, the user is able to have a printed material output by inputting the same password at the operation unit 257 of the cloud print incompatible printer 105.

Figure 8A:
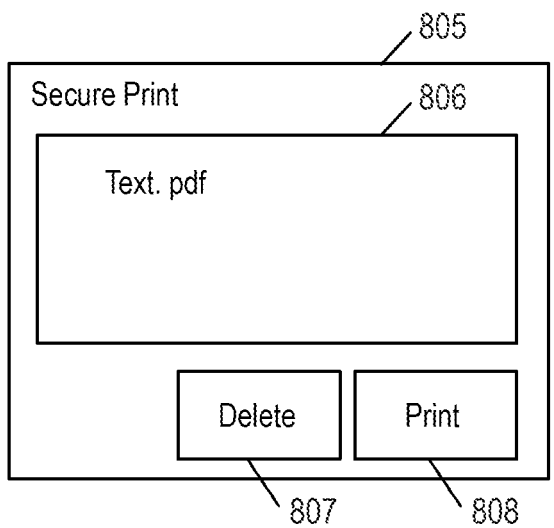
FIG. 8A illustrates a UI displayed by the UI operation unit when the user inputs a password to the password entry region of the print setting extension application and provides a print instruction at the client terminal.
Figure 8B:
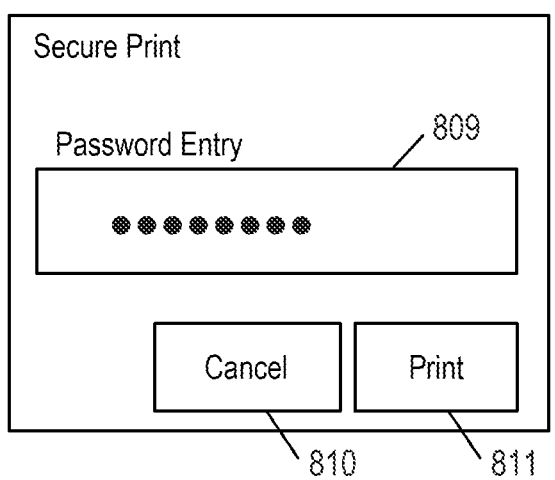
FIG. 8B illustrates an example of a UI displayed by the UI operation unit when the user selects a print job of a document name intended for printing from the print job list and presses the print button.

FIG. 8A and FIG. 8B are diagrams illustrating an example of a UI displayed on the display unit 246 by the UI operation unit 34104 of the cloud print compatible printer 104 at the time of printing with secure print. Note that, since the UI displayed on the display unit 256 by the UI operation unit 35104 of the cloud print incompatible printer 105 at the time of printing of secure print is the same as above, the description thereof will be omitted here.

FIG. 8A illustrates a UI displayed by the UI operation unit 34104 when the user inputs a password to the password entry region 804 of the print setting extension application 312 and provides a print instruction at the client terminal 101.

The UI operation unit 34104 displays a secure print window 805 in accordance with a user operation. In the secure print window 805, a print job list 806 is displayed, and the name of a document to which the user has provided a print instruction is displayed in a selectable manner. The UI operation unit 34104 further displays a delete button 807 and a print button 808. When the delete button 807 is pressed with the name of a document being selected in the print job list 806, the print job thereof is deleted by the device control unit 341. Further, when the print button 808 is pressed with the name of a document being selected in the print job list 806, the UI operation unit 34104 displays a window as illustrated in FIG. 8B.

FIG. 8B illustrates an example of a UI displayed by the UI operation unit 34104 when the user selects a print job of a document name intended for printing from the print job list 806 and presses the print button 808.

The UI operation unit 34104 displays a password entry region 809, a cancel button 810, and a print button 811. The user is able to have a document printed by inputting, to the password entry region 809 of the cloud print compatible printer 104, the same password as the password input to the password entry region 804 (FIG. 7) of the print setting extension application 312 and then pressing the print button 811.

Next, a process flow of a part related to the secure print process in the present embodiment will be described with reference to the flowchart illustrated in FIG. 9 to FIG. 12.

FIG. 9 is a flowchart illustrating a part of a process when the printer driver 332 transmits printer information to the cloud print proxy 331 in S903 of FIG. 4A. All the process illustrated in FIG. 9 is performed when a program of the printer driver 332 stored in the auxiliary storage unit 234 of the cloud print proxy server 103 is loaded into the memory 233 and executed by the CPU 232.

First, the printer driver 332 acquires its own ability information by using the ability response unit 33203 (S201). The ability information includes an ability of print setting that can be designated from outside the printer driver 332.

Next, the printer driver 332 confirms whether or not a secure print ability is included in the ability information acquired in S201 described above (S202). If no secure print ability is included (S202, No), the printer driver 332 proceeds with the process to S208.

On the other hand, if a secure print ability is included (S202, Yes), the printer driver 332 inserts ability information indicating that secure print is available and thereby generates printer information (S203).

Next, the printer driver 332 acquires a hash algorithm of a password of secure print that can be externally received by itself (S204). Note that, in general, a hash algorithm refers to an algorithm name such as MD5, SHA-1, SHA-2, or the like. When the environment is not a cloud print environment, the printer driver 332 uses using the UI unit 33202 to urge the user to input a password at the time of printing. In the cloud print environment as with the present embodiment, however, the printer driver 332 operates on the cloud print proxy server 103 and thus is unable to call a UI to urge the user to input a password. Thus, the printer driver 332 is required to externally receive a password as a part of print settings in a print job. The printer driver 332 of the present embodiment can process a password not only when an externally received password is a plain text (unencrypted data) but also when an externally received password is a hash value (encrypted data). In such a way, a hash algorithm having a hash value that can be received as a password is the information acquired in S204 described above.

Note that a hash algorithm having a hash value that can be received by the printer driver is required to match a hash algorithm having a hash value that can be received by the connected cloud print incompatible printer 105. When a generation method of a hash value that can be received by the cloud print incompatible printer 105 is not a general hash algorithm, the algorithm name may be any name that can identify the generation method thereof. The process flow of the printer driver 332 when a print job is actually received will be described later with reference to FIG. 12.

Next, the printer driver 332 confirms whether or not the receivable hash algorithm is present (S205). If a receivable hash algorithm is present (S205, Yes), the printer driver 332 proceeds with the process to S206.

In S206, the printer driver 332 generates printer information by inserting the receivable hash algorithm as ability information. Note that the printer driver 332 of the present embodiment can receive a password without a hash (plain text) even when a receivable hash algorithm is present. Thus, the printer driver 332 generates printer information by inserting ability information indicating that reception of a plain text password is also enabled (S207).

On the other hand, if no receivable hash algorithm is present (S205, No), the printer driver 332 generates printer information by inserting only the ability information indicating that reception of a plain text password is enabled (S207).

Finally, the printer driver 332 generates printer information also including ability information other than secure print and transmits the printer information to the cloud print proxy 331 (S208). The ability information in the printer information to be transmitted will be described here with reference to FIG. 13A.

FIG. 13A is a diagram illustrating an example of the ability information in the printer information transmitted in S208 of FIG. 9.

The ability information illustrated in FIG. 13A indicates that reception of secure print designation is enabled and reception of a hash value converted by a hash algorithm of SHA-2 (sha2) and reception of a plain text are enabled for a password.

As described above, the printer driver 332 externally transmits that it is possible to receive a password also as a hash value, and this enables adaptation also to an environment where the printer driver 332 is unable to perform UI display, such as a cloud print environment of the present embodiment.

FIG. 10A is a flowchart illustrating a part of a process when the cloud print proxy 331 performs a printer registration request to the cloud print service 321 in S913 of FIG. 4A. All the process illustrated in FIG. 10A is performed when a program of the cloud print proxy 331 stored in the auxiliary storage unit 234 of the cloud print proxy server 103 is loaded into the memory 233 and executed by the CPU 232.

First, the cloud print proxy 331 connects itself to the cloud print service 321 by using the token information acquired in S911 of FIG. 4A (S301).

Next, the cloud print proxy 331 acquires printer information acquired from the printer driver 332 in S903 of FIG. 4A (S302). This printer information includes the ability related to the secure print.

The cloud print proxy 331 then transmits a printer registration request to the cloud print service 321 together with printer information acquired in S302 described above (S303).

FIG. 10B is a flowchart illustrating a part of a process when the cloud print compatible printer 104 performs a printer registration request to the cloud print service 321 in S927 of FIG. 4B. All the process illustrated in FIG. 10B is performed when a program of the device control unit 341 stored in the auxiliary storage unit 244 of the cloud print compatible printer 104 is loaded into the memory 243 and executed by the CPU 242.

First, the device control unit 341 acquires its own ability information by using the ability response unit 34105 (S401).

Next, the device control unit 341 confirms whether or not a secure print ability is included in the ability information acquired in S401 described above (S402). If no secure print ability is included (S401, No), the device control unit 341 proceeds with the process to S408.

On the other hand, if a secure print ability is included (S402, Yes), the device control unit 341 generates printer information by inserting ability information indicating that secure print is available (S403).

Next, the device control unit 341 acquires a hash algorithm of a password for secure print that can be externally received by itself (S404). The hash algorithm may be a general algorithm name or may be any name that can identify a generation method as described above.

Next, the device control unit 341 confirms whether or not reception of a plain text password other than a hash value of a password is enabled (S405). This is because reception of a plain text password can be disabled in administrator settings in the cloud print compatible printer 104.

If reception of a plain text password is also enabled (S405, Yes), the device control unit 341 proceeds with the process to S406.

In S406, the device control unit 341 generates printer information by inserting ability information indicating that reception of a password of a hash value is enabled and reception of a plain text password is also enabled as its own ability information and proceeds with the process to S408.

On the other hand, if reception of a plain text password is disabled (S405, No), the device control unit 341 proceeds with the process to S407.

In S407, the device control unit 341 generates printer information by inserting ability information indicating that only reception of a password of a hash value is enabled as its own ability information and proceeds with the process to S408.

In S408, the device control unit 341 connects itself to the cloud print service 321 by using the token information acquired in S926 of FIG. 4B.

Next, the device control unit 341 transmits a printer registration request to the cloud print service 321 together with the printer information that has been generated so far (S409). The ability information in the printer information to be transmitted will be described here with reference to FIG. 14A.

FIG. 14A is a diagram illustrating an example of the ability information in the printer information to be transmitted.

The ability information illustrated in FIG. 14A indicates that reception of secure print designation is enabled and reception of only a hash value converted by a hash algorithm of SHA-2 (sha2) is enabled for a password.

FIG. 11A is a flowchart illustrating a process in which the print setting extension application 312 displays the print setting extension UI 801 in S1007 of FIG. 6. The process illustrated in FIG. 11A is performed when a program of the print setting extension application 312 stored in the auxiliary storage unit 214 of the client terminal 101 is loaded into the memory 213 and executed by the CPU 212.

First, the print setting extension application 312 acquires ability information from the print queue information acquired in S1006 of FIG. 6 (S501).

Next, the print setting extension application 312 references the ability information acquired in S501 described above to confirm whether or not secure print is available (S502). If the secure print is unavailable (S502, No), the print setting extension application 312 proceeds with the process to S505 without displaying the secure print setting UI 803.

On the other hand, if the secure print is available (S502, Yes), the print setting extension application 312 proceeds with the process to S503.

In S503, the print setting extension application 312 further references the ability information described above to confirm whether or not there is a problem with the format of a receivable password. For example, when transmission of a plain text password is disabled, it is determined that there is a problem if there is no designation of a hash algorithm. Further, even if there is designation of a hash algorithm, it is determined that there is a problem if the print setting extension application 312 does not know the designated hash algorithm or if it is already known that the print setting extension application 312 is unable to generate the designated hash algorithm for some reason.

If it is determined that there is a problem with the format of a receivable password (S503, No), the print setting extension application 312 proceeds with the process to S505 without displaying the secure print setting UI 803. By doing so, even when the print queue of interest has a secure print function, it is possible to set secure print such that the user is unable to designate the secure print if the print setting extension application 312 is unable to correctly process the secure print function.

On the other hand, if it is determined that there is no problem with the format of a receivable password (S503, Yes), the print setting extension application 312 proceeds with the process to S504.

In S504, the print setting extension application 312 displays the secure print setting UI 803 and the password entry region 804 and proceeds with the process to S505.

In S505, the print setting extension application 312 displays a setting UI other than secure print and ends the process of this flowchart.

Figure 11B:
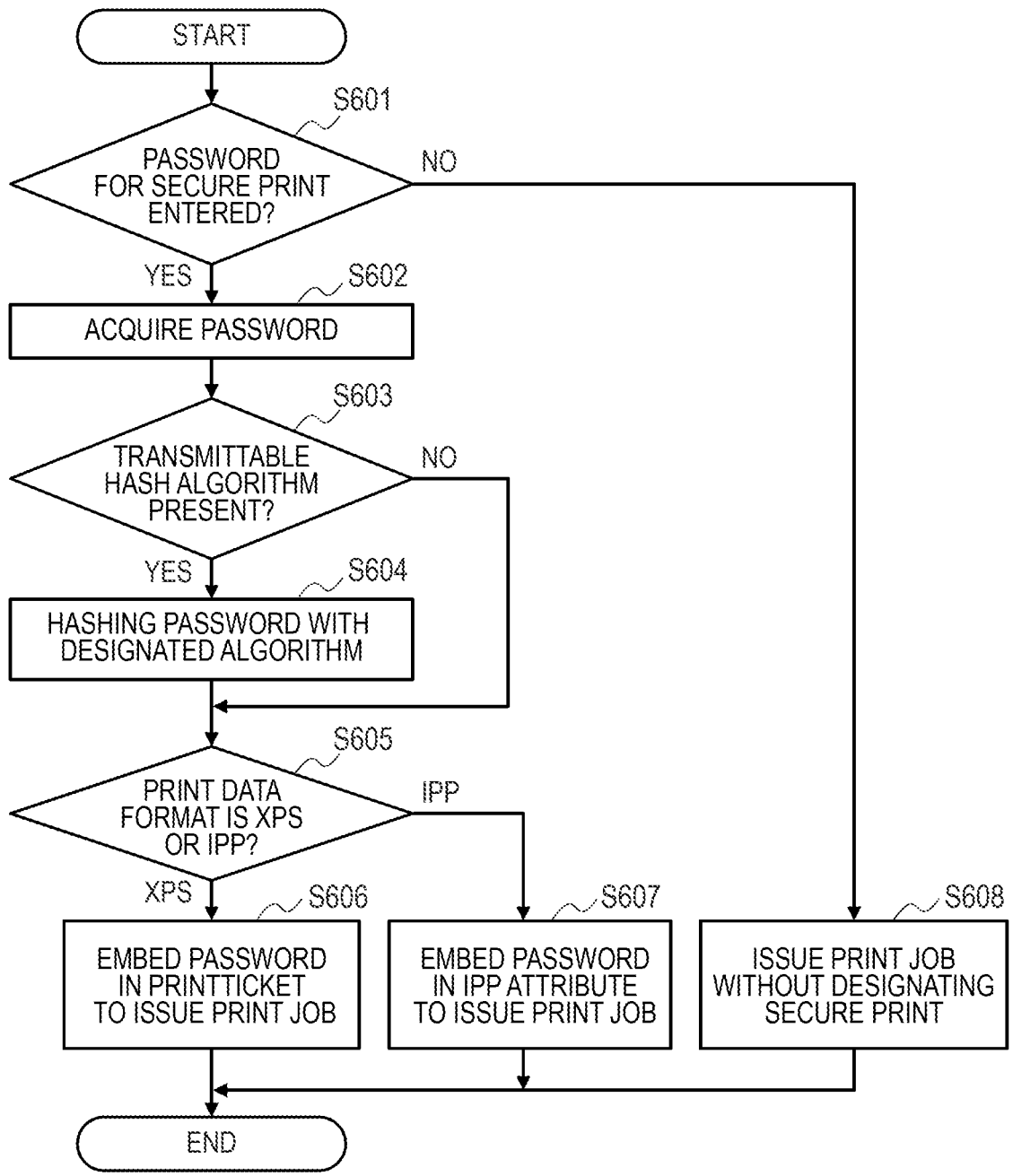
FIG. 11B illustrates a flowchart illustrating a process in which the print setting extension application issues a print job.

FIG. 11B is a flowchart illustrating a process performed by the print setting extension application 312 when the user designates a print setting on the print setting extension UI 801 illustrated in FIG. 7 at the client terminal 101 and provides a print instruction. The process illustrated in FIG. 11B is performed when a program of the print setting extension application 312 stored in the auxiliary storage unit 214 of the client terminal 101 is loaded into the memory 213 and executed by the CPU 212.

First, the print setting extension application 312 confirms whether or not a password of secure print has been input to the password entry region 804 in a print setting on the print setting extension UI 801 (S601).

If no password of secure print has been input (S601, No), the print setting extension application 312 proceeds with the process to S608.

In S608, the print setting extension application 312 issues a print job without designating secure print and ends the process of this flowchart.

On the other hand, if a password of secure print has been input (S601, Yes), the print setting extension application 312 proceeds with the process to S602.

In S602, the print setting extension application 312 acquires the input password character string of secure print described above.

Next, the print setting extension application 312 confirms whether or not a transmittable hash algorithm is present (S603). Note that the transmittable hash algorithm is included in the print queue information acquired from the cloud print service 321 in S1006 of FIG. 6 by the print setting extension application 312.

If a transmittable hash algorithm is present (S603, Yes), the print setting extension application 312 proceeds with the process to S604.

In S604, the print setting extension application 312 converts a password character string acquired in S602 described above into a hash value by using the hash algorithm and proceeds with the process to S605.

On the other hand, if no transmittable hash algorithm is present (S603, No), the print setting extension application 312 handles the password acquired in S602 described above as a character string (plain text) without a change from the input (that is, without a change into a hash value) and proceeds with the process to S605.

In S605, the print setting extension application 312 checks the print data format included in the print queue information described above. If the print data format is XPS (S605, XPS), the print setting extension application 312 proceeds with the process to S606.

In S606, the print setting extension application 312 embeds the password described above in the PrintTicket to issue a print job. FIG. 13B and FIG. 13C illustrate examples of the PrintTicket.

FIG. 13B is a diagram illustrating an example of the PrintTicket when a print job is issued with a plain text password.

FIG. 13C is a diagram illustrating an example of the PrintTicket when a print job is issued with a password converted by a hash algorithm of SHA-2 instead of a plain text.

The description goes back to FIG. 11B below.

Contrary to the above, if the print data format is the IPP (S605, IPP), the print setting extension application 312 proceeds with the process to S607.

In S607, the print setting extension application 312 issues a print job by inserting the password described above into the IPP attribute. FIG. 14B and FIG. 14C illustrate examples of the IPP attribute.

FIG. 14B is a diagram illustrating an example of the IPP attribute when a print job is issued with a plain text password.

FIG. 14C is a diagram illustrating an example of the IPP attribute when a print job is issued with a password converted by a hash algorithm of SHA-2 instead of a plain text.

In a case of printing instructed to the cloud print compatible printer 104, the print job issued in FIG. 11B is transmitted to the cloud print compatible printer 104 via the cloud print service 321.

On the other hand, in a case of printing instructed to the cloud print incompatible printer 105, the print job issued in FIG. 11B is transmitted to the cloud print proxy 331 via the cloud print service 321. The cloud print proxy 331 acquires a print job via the cloud print service I/F unit and transmits the print job to the printer driver 332 via the printer driver I/F unit. The printer driver 332 then receives a print job from the cloud print proxy 331 and transmits the print job to the cloud print incompatible printer 105 (details will be described later with FIG. 12).

As described above, a print job requiring entry of a password on the printer side when printing is performed can be issued as a print job printed by a registered printer of the cloud print service 321 via the cloud print service 321 by using the print setting extension application 312. Accordingly, secure print can be implemented via the cloud print service 321.

Note that a printer that can perform secure print via the cloud print service 321 is not only the cloud print compatible printer 104 directly registered to the cloud print service 321, as described above. The cloud print incompatible printer 105 indirectly registered to the cloud print service 321 via the cloud print proxy 331 and the printer driver 332 can also perform secure print via the cloud print service 321.

To realize this, the printer driver 332 of the present embodiment is provided with a novel function of receiving print data from the cloud print proxy 331 and a password required when printing the print data. Conventionally, there has been no printer driver that receives print data and a password required when printing the print data, as with the printer driver 332. Thus, with the conventional printer driver, it is not possible to implement secure print via the cloud print service 321 by using the cloud print incompatible printer 105. To solve this problem, the printer driver 332 is newly provided with a novel function described above (a function of receiving print data and a password) and a function of transmitting print data and a password to a printer.

Note that, conventionally, there has been a print server that receives print data and a password and transmits the print data and the password to a printer. However, this type of print server merely has a mechanism that a print queue delivers received print data and password to a printer but does not have the mechanism that a printer driver performs such delivery. In the present embodiment, the printer driver 332 is configured to receive print data and a password, convert this print data into print data (generate print data) that can be processed by the printer 105, and deliver the converted print data and the password to the printer 105. This configuration is apparently different from the conventional one.

Further, as described above, there are a hash-valued password (encrypted password) and a plain text password (unencrypted password) in passwords for secure print. That is, the printer driver 332 may receive an encrypted password or an unencrypted password. If an unencrypted password is received, it would be preferable to encrypt the password at the printer driver 332 and transmit the encrypted password to a printer to perform printing with high security. In a mechanism that encrypts passwords uniformly, however, already-encrypted passwords would be inconveniently encrypted again. To solve such a novel problem, a novel mechanism is required for the printer driver 332 of the present embodiment. This will be described in detail below.

FIG. 12 is a flowchart illustrating a process of the printer driver 332 that has acquired a print job. All the process illustrated in FIG. 12 is performed when a program of the printer driver 332 stored in the auxiliary storage unit 234 of the cloud print proxy server 103 is loaded into the memory 233 and executed by the CPU 232.

First, the printer driver 332 acquires a printer job at the print job management unit 33201 (S701).

Next, the printer driver 332 confirms whether or not a secure print setting is present in the print job acquired in S701 described above (S702). If no secure print setting is present (S702, No), the printer driver 332 proceeds with the process to S709.

In S709, the printer driver 332 generates PDL without a secure print setting from the print job acquired in S701 described above and proceeds with the process to S710.

On the other hand, if a secure print setting is present, the printer driver 332 proceeds with the process to S703.

In S703, the printer driver 332 confirms whether the password in the print job is a hash value or a plain text. If the password is a hash value (S703, Yes), the printer driver 332 proceeds with the process to S704.

In S704, the printer driver 332 confirms whether or not the hash algorithm corresponding to the password described above is appropriate. It is determined to be appropriate if the hash algorithm matches a hash algorithm that can be interpreted by the cloud print incompatible printer 105, and it is determined to be inappropriate if the hash algorithm does not match the same.

If the hash algorithm is appropriate (S704, Yes), the printer driver 332 proceeds with the process to S707.

In S707, the printer driver 332 embeds the hash value of the passwords as it stands to generate PDL and proceeds with the process to S710.

On the other hand, if the hash algorithm is inappropriate (S704, No), the printer driver 332 proceeds with the process to S706.

In S706, the printer driver 332 generates PDL of an input value error, and proceeds with the process to S710. The PDL of the input value error includes a control command used for causing the cloud print incompatible printer 105 to perform error display. Accordingly, the user is able to know that a print job ended in an error due to inappropriate input value.

Further, if the password in the print job is not a hash value but a plain text in S703 described above (S703, No), the printer driver 332 proceeds with the process to S705.

In S705, the printer driver 332 converts the password into a hash value by a predetermined hash algorithm and proceeds with the process to S708.

In S708, the printer driver 332 embeds the hash value converted in S705 described above to generate PDL and proceeds with the process to S710.

Finally, the printer driver 332 transmits the PDL generated in S706, S707, S708, or S709 described above to the cloud print incompatible printer 105 (S710).

As described above, if a password in a print job received by the printer driver 332 is a hash value, the hash value is transmitted to the cloud print incompatible printer 105 as it stands. Further, if a password in a print job received by the printer driver 332 is a plain text, the password is converted into a hash value, and the converted hash value is transmitted to the cloud print incompatible printer 105. With such a configuration, it is possible to use secure print even in an environment in which the printer driver 332 is unable to perform UI display. That is, it is possible to solve the problem described above and perform secure print via the cloud print service 321 even with the cloud print incompatible printer 105. Further, it is also possible to perform secure print by using a hash algorithm suitable for secure print via a cloud print service instead of transmitting a password in a plain text. Therefore, the security in the cloud print system can be improved.

As described above, secure print can be performed via a cloud print server. Further, when secure print is performed at a cloud print incompatible printer via a cloud print server, a password of secure print can be suitably encrypted, if necessary, by a printer driver in a cloud print proxy server. Accordingly, even when printing is performed at a cloud print incompatible printer, secure print via a cloud print server can be suitably performed.

In the embodiment described above, the configuration in which the print setting extension application 312 acquires, via the cloud print service 321, a hash algorithm of a password that can be received by the cloud print compatible printer 104 or the cloud print proxy 331 has been described. However, the print setting extension application 312 may be configured to perform hashing on a password by using a predetermined hash algorithm without acquiring a hash algorithm via the cloud print service 321.

Note that, obviously, the configuration of various data and the content thereof described above are not limited to those described and may be configured in various configurations or contents in accordance with the use or the purpose.

Although one embodiment has been illustrated above, the present invention can take a form of an embodiment as a system, an apparatus, a method, a program, a storage medium, or the like, for example. Specifically, the present invention may be applied to a system formed of a plurality of devices or may be applied to an apparatus formed of a single device.

Further, all the configurations combining the embodiments described above are included in the present invention.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, secure print can be performed via a cloud print service.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2021-000462, filed Jan. 5, 2021, which is hereby incorporated by reference herein in its entirety.

What is claimed is:

1. An image forming apparatus comprising:
an operation unit; and
one or more processors configured to:
notify a server system of information indicating a hash algorithm that is to be used by an information processing apparatus for generating a hash based on a password input to the information processing apparatus;
receive a print job including the hash generated according to the notified hash algorithm from the server system, wherein the print job has been transmitted to the server system by the information processing apparatus; and
determine, based on a password input via the operation unit and the hash included in the received print job, whether the image forming apparatus permits printing based on the print job.

2. The image forming apparatus according to claim 1, wherein the processor permits printing based on the print job, in a case that the password input via the operation unit is same as the password input to the information processing apparatus.

3. The image forming apparatus according to claim 2, wherein the processor does not permit printing based on the print data, in a case that the password input via the operation unit is different from the password input to the information processing apparatus.

4. A method performed by an image forming apparatus comprising an operation unit, the method comprising steps of:
notifying a server system of information indicating a hash algorithm to be used for generating a hash based on a password input to an information processing apparatus;
receiving a print job including the hash generated according to the notified hash algorithm from the server system, wherein the print job has been transmitted to the server system by the information processing apparatus; and
determining, based on a password input via the operation unit and the hash included in the received print job, whether the image forming apparatus permits printing based on the print job.

5. The method according to claim 4, wherein the control method is further comprising:
performing printing based on the print job, in a case that the password input via the operation unit is same as the password input to the information processing apparatus.

6. The method according to claim 5, wherein the printing based on the print job is not performed in a case that the password is different from the password input to the information processing apparatus.

7. A server system that receives print data from an information processing apparatus and transmits the print data to an image forming apparatus, the server system comprising:
one or more processors configured to:
obtain, from the image forming apparatus, information indicating a hash algorithm supported by the image forming apparatus;
notify the information processing apparatus of the obtained information;
receive, from the information processing apparatus, a print job including a hash generated based on the hash algorithm; and
transmit, to the image forming apparatus, the received print job including the hash.

8. A control method of a first information processing apparatus storing a printer driver, the method comprising:
transmitting a hash algorithm supported by the printer driver to a server system;
receiving, from the server system, a print job including a hash that has been generated according to the hash algorithm by a second information processing apparatus; and
transmitting, to an image forming apparatus, the print job including the hash.

9. The control method according to claim 8, wherein the printer driver converts a format of the print job into another format of the print job.

10. The control method according to claim 9, wherein the first information processing apparatus transmits the print data that has been converted to a printer.

11. The control method according to claim 8, further comprising:
transmitting capability information provided by the printer driver stored in the first information processing apparatus to the server system.

* * * * *